(12) United States Patent
Kamijyo

(10) Patent No.: US 6,825,904 B2
(45) Date of Patent: Nov. 30, 2004

(54) LIQUID CRYSTAL DEVICE, COLOR FILTER SUBSTRATE WITH VAPOR DEPOSITED METAL OXIDE INSULATING LAYER UNDER TRANSPARENT CONDUCTOR, METHOD FOR MANUFACTURING LIQUID CRYSTAL DEVICE, AND METHOD FOR MANUFACTURING COLOR FILTER SUBSTRATE

(75) Inventor: Koich Kamijyo, Nagano-ken (JP)

(73) Assignee: Seiko Epson Corporation (JP)

( * ) Notice: Subject to any disclaimer, the term of this patent is extended or adjusted under 35 U.S.C. 154(b) by 354 days.

(21) Appl. No.: 09/904,579

(22) Filed: Jul. 13, 2001

(65) Prior Publication Data

US 2002/0130991 A1 Sep. 19, 2002

(30) Foreign Application Priority Data

Jul. 14, 2000 (JP) ........................................ 2000-214702
Jun. 29, 2001 (JP) ........................................ 2001-199703

(51) Int. Cl.[7] .......................................... G02F 1/1333
(52) U.S. Cl. ................................................ 349/122
(58) Field of Search ............................ 349/104, 105, 349/106

(56) References Cited

FOREIGN PATENT DOCUMENTS

| JP | 61-116332 | 6/1986 |
|---|---|---|
| JP | 63-044627 | 2/1988 |
| JP | 1-233420 | 9/1989 |
| JP | 01-233420 | 9/1989 |
| JP | 2-022622 | 1/1990 |
| JP | 02-037326 | 2/1990 |
| JP | 03-022220 U | 3/1991 |
| JP | 06-201912 | 7/1994 |
| JP | 6-208002 | 7/1994 |
| JP | 7-013147 | 1/1995 |
| JP | 07-013147 | 1/1995 |
| JP | 7-318703 | 12/1995 |
| JP | 10-208554 | 8/1998 |
| JP | 10-319226 | 12/1998 |
| JP | 11-323552 | 11/1999 |

OTHER PUBLICATIONS

Examination results of corresponding Japanese Application 2000–199703.
Communication from Chinese Patent Office re counterpart application.
Examination Results of corresponding Korean application.
Examination Results of corresponding Japanese application 2001–199703.
Examination Report of corresponding Japanese application 2001–199703.

Primary Examiner—Tarifur R. Chowdhury
Assistant Examiner—Timothy L Rude
(74) Attorney, Agent, or Firm—Harness, Dickey & Pierce, P.L.C.

(57) ABSTRACT

On a surface of a color filter composed of color layers 112 and a surface protective layer 113, an insulating film 114 composed of a transparent metal oxide is formed. The insulating film 114 is formed by depositing a metal oxide primarily composed of at least one of $Ta_2O_5$, $ZrO_2$, and $TiO_2$ on the color filter by a sputtering method or the like. On the surface of the insulating film 114, transparent electrodes 115 each having a predetermined pattern are formed.

20 Claims, 14 Drawing Sheets

(a)

(b)

(a)

(b)

(a)

(b)

(a)

(b)

(a)

(b)

(c)

LIQUID CRYSTAL DEVICE, COLOR FILTER SUBSTRATE WITH VAPOR DEPOSITED METAL OXIDE INSULATING LAYER UNDER TRANSPARENT CONDUCTOR, METHOD FOR MANUFACTURING LIQUID CRYSTAL DEVICE, AND METHOD FOR MANUFACTURING COLOR FILTER SUBSTRATE

BACKGROUND OF THE INVENTION

1. Technical Field of the Invention

The present invention relates to liquid crystal devices, color filter substrates, methods for manufacturing liquid crystal devices, and methods for manufacturing color filter substrates.

2. Description of the Related Art

In general, in a liquid crystal device having a liquid crystal panel in which a pair of substrates composed of a glass or the like holds liquid crystal therebetween, a color filter substrate may be used in some cases in order to perform color display. In this color filter substrate, color layers (for example, R (red), G (green), B (blue), and BM (black: black matrix or black mask)) for constituting a filter portion of the color filter are formed on a surface of a transparent substrate such as a glass. These color layers are formed of a resin containing a coloring agent, such as a pigment or a dye.

In the color filter, a surface protective layer composed of a transparent resin or the like is generally formed on the color layers. This surface protective layer is formed for preventing infiltration of a chemical solution when another layer (such as a transparent electrode pattern) is further formed on the color filter and, in addition, is formed so as to ensure the flatness of the surface of the color filter.

On the surface of the color filter, transparent electrodes composed of a transparent conductive material such as ITO (Indium Tin Oxide) may be formed in some cases. However, in general, since the adhesion between the surface protective layer and the transparent electrodes described above is insufficient, when the transparent electrodes are formed directly on the color filter, there has been a problem in that the pattern accuracy of the electrode pattern cannot be ensured. Accordingly, heretofore, an insulating film (an intermediate layer) composed of $SiO_2$ is formed by sputtering or the like on the surface of the surface protective layer formed on the color filter, and the transparent electrodes are formed on this insulating film.

When the transparent electrodes are formed on the insulating film described above, since the transparent electrodes are formed by patterning a transparent conductive film formed by sputtering or the like, a resist pattern on the transparent conductive layer must be developed by using an alkaline solution such as an aqueous solution containing potassium hydroxide, and in addition, after the transparent electrodes are formed by patterning, the remaining resist pattern on the electrode pattern must be removed by an alkaline solution.

However, since an insulating film composed of $SiO_2$ has poor resistance against the alkaline solution described above, the insulating film is adversely influenced by this chemical treatment, for example, part of the insulating film is dissolved by the alkaline solution while the transparent electrodes are formed by patterning, and as a result, the insulating film may be separated from the color filter in some cases.

In addition, when an insulating film composed of $SiO_2$ is formed by using a sputtering apparatus, $SiO_2$ adhered to the inside of the apparatus is spread in the powdered form, and as a result, there is a problem in that the environment is contaminated. The reason for this is that since $SiO_2$ has a coefficient of thermal expansion significantly different from those of metal constituent members used inside the apparatus and also has the property of easily absorbing the moisture in air, the $SiO_2$ adhered to the inside of the apparatus is easily separated from the inside surface of the apparatus after sputtering is completed. In addition, when a $SiO_2$ film is formed by sputtering, an abnormal discharge is likely to occur on the target due to a low dielectric constant thereof, and hence, there is also a problem in that it is difficult to obtain stable film-forming conditions.

Furthermore, compared to the transparent electrode described above generally having a high refractive index of approximately 1.8 to 1.9, since the insulating film composed of $SiO_2$ has a low refractive index (n=1.455), the light transmittance is decreased due to the occurrence of light reflection or interference at the interface between the insulating film and the transparent electrode, and as a result, there has been a problem in that the brightness of display is decreased.

Accordingly, the present invention was made to solve the problems described above, and an object of the present invention is, in a color filter substrate or a liquid crystal device having a conductive film formed on the color filter, to provide a structure which can suppress the problems caused by an insulating film provided between the color filter and the conductive film.

SUMMARY OF THE INVENTION

A liquid crystal device of the present invention comprises: a first substrate; a second substrate disposed so as to oppose the first substrate; a color layer provided on the first substrate; an insulating film provided on the color layer and comprising at least one of $Ta_2O_5$, $ZrO_2$, and $TiO_2$ as a primary component; and a conductive film having the property of transmitting light provided on the insulating film.

Since $Ta_2O_5$, $ZrO_2$, and $TiO_2$ each has a refractive index higher than that of $SiO_2$, the difference in refractive index from the transparent conductive layer can be decreased, and the optical loss at a laminated portion formed of the transparent conductive layer and the insulating film can be decreased. In particular, the refractive index of the metal oxide described above which is formed by a vapor phase method can also be controlled or adjusted by the film-forming conditions therefor. In addition, since the insulating film used in the present invention is unlikely to produce particles compared to that composed of $SiO_2$, the degree of contamination in the environment in the manufacturing process can be decreased.

In addition, since both $Ta_2O_5$ and $ZrO_2$ formed by a vapor phase method have sufficient corrosion resistance against an alkaline solution, the separation thereof is unlikely to occur when an alkaline solution is used for patterning the transparent conductive layer. That is, the insulating film preferably comprises at least one of $Ta_2O_5$ and $ZrO_2$ so as to have alkali resistance.

When an optional wavelength in the visible wavelength region is represented by $\lambda$, it is preferable that the sum of the optical thickness of the insulating film and the optical thickness of the conductive film of the present invention be substantially equal to the product of $\lambda/2$ and a natural number. In the case described above, at the surface of the insulating film at the color filter side and at the surface of the conductive film at the side opposite to the color filter, reflectance of a visible light can be decreased, and as a result, the light transmittance can be increased.

The optical thickness can be represented by n·d (n is the refractive index of the laminated portion, and d is the total thickness of the insulating film and the conductive film) when the insulating film and the conductive film have substantially the same refractive index, and when the refractive index of the insulating film and the refractive index of the conductive film substantially differ from each other, the optical thickness can be represented by $n_1 \cdot d_1 + n_2 \cdot d_2$ ($n_1$ is the refractive index of the insulating film, $d_1$ is the thickness of the insulating film, $n_2$ is the refractive index of the conductive film, and $d_2$ is the thickness of the conductive film). In addition, the visible wavelength region described above is a region in which the wavelength is in the range of from 380 nm to 780 nm. As a typical wavelength in the visible wavelength region, λ described above is preferably 550 nm.

In the present invention, it is preferable that a transparent resin film be further provided between the color layer and the insulating film. This transparent resin film (the surface protective layer described later) is generally formed so as to protect the color layer and, in addition, is formed so as to planarize the surface of the color filter. By forming this resin film, the insulating film is further planarized.

In the present invention, there may be a case in which a reflective film is further provided between the color layer and the first substrate. In a reflective liquid crystal device or in a transflective liquid crystal device, by providing the reflective film, reflective display using ambient light can be realized. As a material for the reflective film, aluminum, an aluminum alloy, chromium, a chromium alloy, silver, a silver alloy, and the like can be generally used. In the case described above, by providing opening portions in the reflective film described above, since light is allowed to pass through these opening portions, a transflective liquid crystal device can be formed.

In the present invention, there may be a case in which an underlying layer composed of a material substantially identical to that for the insulating film described above is further provided on the second substrate described above, and an active element is further provided on the underlying layer described above. The underlying layer composed of the material substantially identical to that for the insulating film can improve the adhesion of the second substrate with the active element, a conductive film forming wires and electrodes electrically connected to the active element, and the like. As the active element, for example, a TFD (Thin Film Diode) may be mentioned.

In addition, another liquid crystal device of the present invention comprises: a first substrate; a second substrate disposed so as to oppose the first substrate; a color layer provided on the first substrate; an insulating film provided on the color layer and comprising $Ta_2O_5$ as a primary component; and a conductive film having the property of transmitting light provided on the insulating film. Since the insulating film comprising $Ta_2O_5$ as a primary component has high corrosion resistance against an alkaline solution, the separation thereof is unlikely to occur even when the transparent conductive layer is patterned by using an alkaline solution. In addition, since the insulating film described above has a high refractive index compared to that composed of $SiO_2$, the difference in refractive index from the transparent conductive layer can be decreased, whereby the optical loss at the laminated portion formed of the transparent conductive layer and the insulating film can be decreased. Furthermore, since the insulating film described above is unlikely to produce particles compared to that composed of $SiO_2$, the degree of contamination in the environment in the manufacturing process can be decreased.

In the liquid crystal device described above, the insulating film preferably comprises at least one of $ZrO_2$, $TiO_2$, and $SiO_2$ as a component. In addition to $Ta_2O_5$, when at least one of $ZrO_2$, $TiO_2$, and $SiO_2$ is contained as a primary component, the refractive index, the dielectric constant, and the like can be adjusted, and hence, the degree of freedom of optical and electrical design for the apparatus can be ensured.

In particular, concerning the transparent conductive layer, since there are essentially limitations of the thickness and the composition in order to obtain desired electrical properties (the absolute value of resistance, resistivity, and the like), it has been difficult to obtain a desired thickness and a refractive index (which varies in accordance with the composition or film-forming conditions) in terms of optical properties, and hence, the degree of freedom of optical design has been limited. However, when the insulating film is formed so that the refractive index thereof is close to that of the transparent conductive layer compared to that obtained in the past, the insulating film and the transparent conductive film can be regarded as materials having optical properties similar to each other (for example, an integrated material). As a result, when the thickness, the refractive index, and the like of the insulating film are adequately designed, for example, the laminated portion formed of the insulating film and the transparent conductive layer can be regarded as an integrated optical element, whereby the degree of freedom of optical design can be increased. In particular, it is preferable that the refractive index of the insulating film and the refractive index of the transparent conductive film be substantially equal to each other.

In addition, still another liquid crystal device of the present invention comprises an insulating film comprising at least one of $Ta_2O_5$, $ZrO_2$, and $TiO_2$ as a primary component, and a conductive film having the property of transmitting light provided on the insulating film.

Furthermore, another liquid crystal device of the present invention comprises: a first substrate; a second substrate disposed so as to oppose the first substrate; a color layer provided on the first substrate; an insulating film provided on the color layer, having the property of transmitting light, a refractive index of 1.6 to 2.0 in the visible wavelength region, and a thickness of 10 nm to 100 nm; and a conductive film provided on the insulating film, having the property of transmitting light, a refractive index of 1.8 to 1.9 in the visible wavelength region, and a thickness of 100 nm to 300 nm.

In the liquid crystal device described above, the difference in refractive index between the insulating film and the conductive film can be decreased compared to that obtained in the past, and in addition, since the sum of the optical thicknesses of the insulating film and the conductive film is approximately one time to two times the visible wavelength λ, the reflection at the interface can be reduced, whereby the optical loss caused by the laminated portion formed of the insulating film and the transparent conductive layer can be reduced.

In addition, still another liquid crystal device of the present invention comprises: an insulating film having a refractive index of 1.6 to 2.0 in the visible wavelength region and a thickness of 10 nm to 100 nm; and a conductive film provided on the insulating film, having the property of transmitting light, a refractive index of 1.8 to 1.9 in the visible wavelength region, and a thickness of 100 nm to 300 nm.

Next, a color filter substrate of the present invention comprises: a substrate; a color layer provided on the substrate; an insulating film provided on the color layer and comprising at least one of $Ta_2O_5$, $ZrO_2$, and $TiO_2$ as a primary component; and a conductive film having the property of transmitting light provided on the insulating film.

In addition, another color filter substrate of the present invention comprises: a substrate; a color layer provided on the substrate; an insulating film provided on the color layer and comprising $Ta_2O_5$ as a primary component; and a conductive film having the property of transmitting light provided on the insulating film.

Furthermore, still another color filter substrate of the present invention comprises: a substrate; a color layer provided on the substrate; an insulating film provided on the color layer, having the property of transmitting light, a refractive index of 1.6 to 2.0 in the visible wavelength region, and a thickness of 10 nm to 100 nm; and a conductive film provided on the insulating film, having the property of transmitting light, a refractive index of 1.8 to 1.9, and a thickness of 100 nm to 300 nm.

Next, a method for manufacturing a liquid crystal device of the present invention comprises: a step of forming a color layer on a first substrate; a step of forming an insulating film on the color layer, the insulating film comprising at least one of $Ta_2O_5$, $ZrO_2$, and $TiO_2$ as a primary component; a step of forming a conductive film having the property of transmitting light on the insulating film; and a step of patterning the conductive film by using an alkaline solution. Since the insulating film described above has high alkali resistance, even when the conductive film is patterned by using an alkaline solution, degradation of the film quality and separation of the film are unlikely to occur, and in addition, damage that might be done on the color layer formed thereunder can also be prevented.

In the method described above, the insulating film and the conductive film are preferably formed so that when an optional wavelength in the visible wavelength region is represented by $\lambda$, the sum of the optical thickness of the insulating film and the optical thickness of the conductive film is substantially equal to the product of $\lambda/2$ and a natural number.

In addition, the method described above preferably further comprises a step of forming a transparent resin film on the color layer.

Furthermore, the method described above preferably further comprises a step of forming a reflective film on the first substrate. In this step, when opening portions are provided in the reflective film, a transflective liquid crystal device can be formed.

In addition, the method described above preferably further comprises a step of forming an underlying layer composed of a material substantially identical to that for the insulating film on the second substrate, and a step of forming an active element on the underlying layer. By forming the underlying layer composed of the material substantially identical to that for the insulating film, the adhesion of the substrate with the active element, and wires and electrodes connected thereto, can be improved. In addition, since the insulating film formed on the first substrate and the underlying layer formed on the second substrate are composed of substantially the same material, the process control can be easily performed, and the manufacturing cost can also be reduced. Furthermore, the insulating film and the underlying layer may be simultaneously formed on the first substrate and the second substrate, respectively.

In particular, by forming a metal conductive layer primarily composed of Ta on the second substrate with an insulating film comprising $Ta_2O_5$ as a primary component provided therebetween, the adhesion between the metal conductive layer and the substrate can be increased, and in addition, diffusion of the impurities from the substrate can be prevented. As described above, when the layer comprising $Ta_2O_5$ as a primary component is formed on each of the pair of substrates forming the liquid crystal device, since the film-forming apparatus can be interchangeably used, and the insulating film and the insulating layer can be simultaneously formed, flexibility of the manufacturing process can be increased, and in addition, the number of the manufacturing steps can also be decreased.

In the present invention, the insulating film described above is preferably formed by vapor phase film-forming means. The metal oxide formed by vapor phase film-forming means, such as PVD (physical vapor deposition) or CVD (chemical vapor deposition), is stable at a heating temperature (approximately 200 to 300° C.) for forming the transparent conductive layer, has dense film quality, and has superior alkali resistance. In particular, PVD (a physical vapor deposition method or a physical deposition method), such as a deposition method, a sputtering method, or an ion plating method, is preferably used for film formation.

In addition, another method for manufacturing a liquid crystal device of the present invention comprises: a step of forming a color layer on a substrate; a step of forming an insulating film on the color layer, the insulating film comprising $Ta_2O_5$ as a primary component and at least one of $ZrO_2$, $TiO_2$, and $SiO_2$ as a component; a step of forming a conductive film having the property of transmitting light on the insulating film; and a step of patterning the conductive film by using an alkaline solution.

Furthermore, still another method for manufacturing a liquid crystal device of the present invention comprises: a step of forming a color layer on a substrate; a step of forming an insulating film on the color layer, the insulating film having the property of transmitting light, a refractive index of 1.6 to 2.0 in the visible wavelength region, and a thickness of 10 nm to 100 nm; and a step of forming a conductive film on the insulating film, the conductive film having the property of transmitting light, a refractive index of 1.8 to 1.9 in the visible wavelength region, and a thickness of 100 nm to 300 nm.

Next, a method for manufacturing a color filter substrate according to the present invention comprises: a step of forming a color layer on a substrate; a step of forming an insulating film on the color layer, the insulating film comprising at least one of $Ta_2O_5$, $ZrO_2$, and $TiO_2$ as a primary component; a step of forming a conductive film having the property of transmitting light on the insulating film; and a step of patterning the conductive film by using an alkaline solution.

In addition, another method for manufacturing a color filter substrate of the present invention comprises: a step of forming a color layer on a substrate; a step of forming an insulating film on the color layer, the insulating film having the property of transmitting light, a refractive index of 1.6 to 2.0 in the visible wavelength region, and a thickness of 10 nm to 100 nm; and a step of forming a conductive film on the insulating film, the conductive film having the property of transmitting light, a refractive index of 1.8 to 1.9 in the visible wavelength region, and a thickness of 100 nm to 300 nm.

In the methods described above according to the present invention, it is preferable that the insulating film and the conductive film be successively formed in the same apparatus. In the case in which the insulating film is formed by vapor phase film-forming means, when the insulating film is formed in the same apparatus as that for forming the transparent conductive film, and successively, the conductive film is formed, the cleanness at the interface between the insulating film and the transparent conductive layer can be ensured, whereby the adhesion between the two layers can be improved, and in addition, the optical and the electrical properties can be improved by virtue of the decrease in contamination at the interface. In the case described above, it is particularly preferable that the insulating film and the conductive film be successively formed by a sputtering method in the same sputtering apparatus.

In addition, in the step of patterning the conductive film described above, patterning treatment is preferably performed on the conductive film described above by etching using an alkaline solution. In patterning treatment, for example, there may be a case in which a resist pattern is formed by development using an alkaline solution, and the transparent conductive film is then patterned by using this resist pattern. In addition, after the transparent conductive layer is patterned, an alkaline solution is also used for removing the remaining resist pattern. In the case described above, since the insulating film is formed of a material having high alkali resistance, the insulating film is prevented from being corroded by the alkaline solution, and hence, a problem in that the insulating film is separated from the color filter or the like can be avoided.

The color filter substrate described above can be applied to various liquid crystal devices: which use various display principles, such as a TN or an STN type; which are provided with various panel structures, such as an active matrix type, a passive matrix type, or a segment type; and which are provided with various structures, such as a transmissive type, a reflective type, or a transflective type. In addition to the liquid crystal devices described above, the color filter substrate can also be used as color filter portions of various devices, such as a display portion of a CRT (a cathode ray tube) or a light-receiving surface portion of an imaging tube, as long as the devices are each provided with a color filter and a transparent conductive layer.

DETAILED DESCRIPTION OF THE PREFERRED EMBODIMENTS

Next, referring to the accompanying drawings, a liquid crystal device, a color filter substrate, a method for manufacturing a liquid crystal device, and a method for manufacturing a color filter substrate according to the present invention will be described in detail.

First Embodiment

Figure 1:
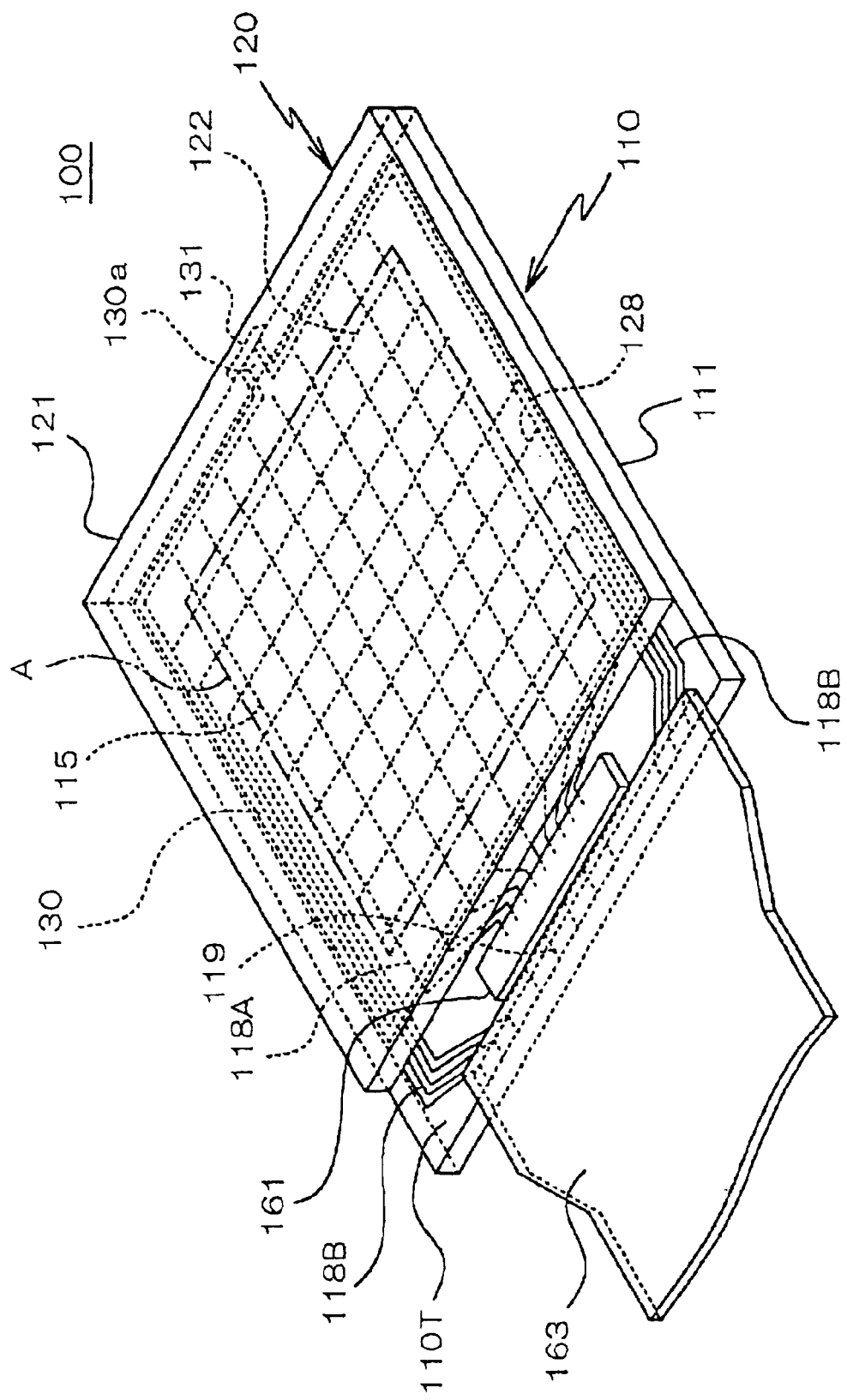
FIG. 1 is schematic perspective view showing the appearance of a liquid crystal panel according to a first embodiment of a liquid crystal device and a color filter substrate of the present invention.
Figure 2:
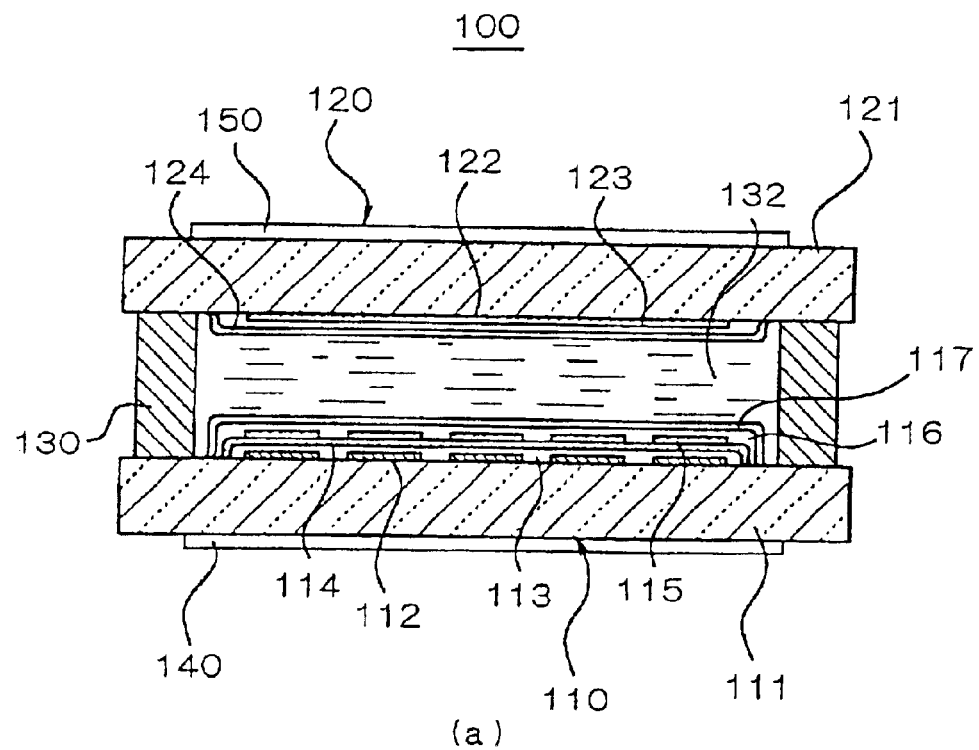
FIG. 2 includes a rough cross-sectional view (a) schematically showing the structure of the liquid crystal panel and a rough expanded plan view (b) schematically showing the structure of the color filter substrate according to the first embodiment of the liquid crystal device and the color filter substrate of the present invention.
Figure 2:
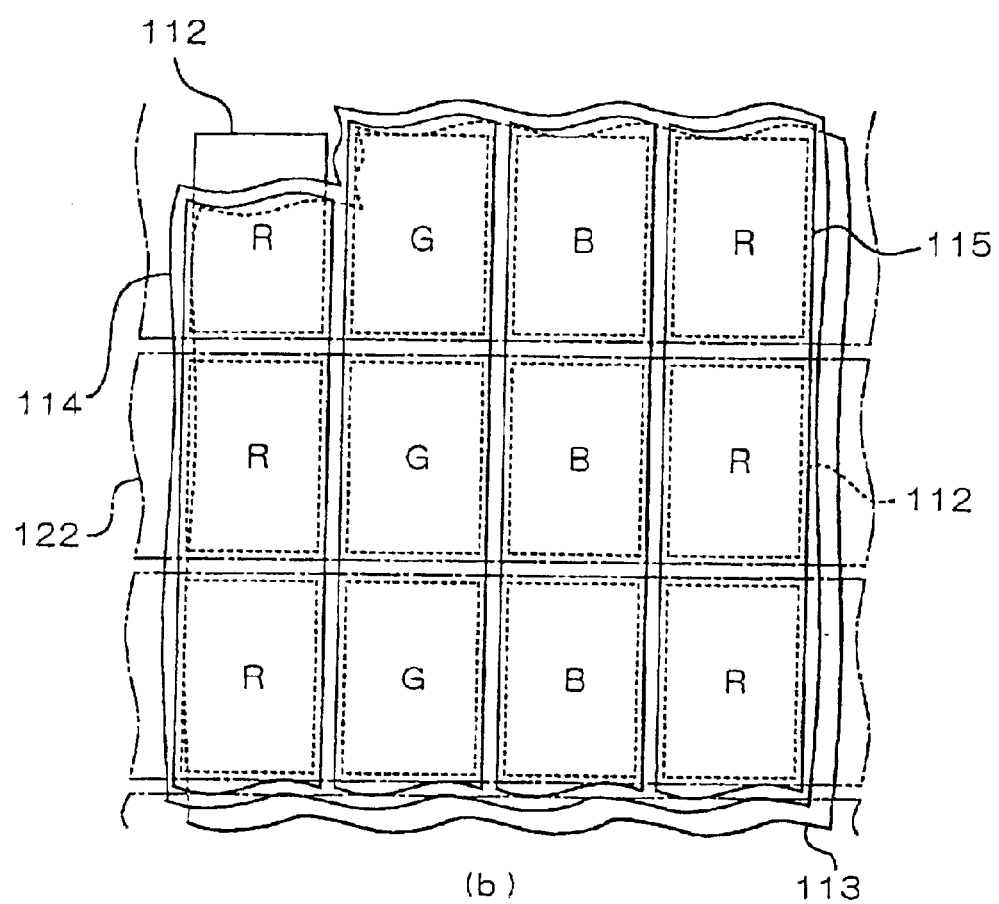

FIG. 1 is a perspective view showing the appearance of a liquid crystal panel 100 provided with a color filter substrate 110 of a liquid crystal device according to a first embodiment of the present invention, FIG. 2(a) is a rough cross-sectional view schematically showing the structure of the liquid crystal panel 100, and FIG. 2(b) is a plan view showing a surface structure of the color filter 110.

This liquid crystal device is formed of a liquid crystal panel 100 having a so-called transmissive and a passive matrix structure provided with, when necessary, a case body, a lighting element, such as a backlight or a front light, and so on, which are not shown in the figure. As shown in FIG. 1, the liquid crystal panel 100 has a cell structure which is formed by steps of: adhering a color filter substrate 110 having a transparent first substrate 111 as a base body composed of a glass plate, a synthetic resin plate, or the like to an opposing substrate 120 having a second substrate 121 as a base body by a sealing material 130 provided therebetween so that the two substrates oppose each other; injecting liquid crystal 132 inside the sealing material 130 via an opening portion 130a; and sealing the opening portion by an encapsulating material 131.

On the interior surface (the surface opposing the second substrate 121) of the first substrate 111, a plurality of transparent electrodes 115 aligned in parallel like stripes are formed, and on the interior surface of the second substrate 121, a plurality of transparent electrodes 122 aligned in parallel like stripes are formed. In addition, the transparent electrodes 115 are electrically connected to wires 118A, and the transparent electrodes 122 are electrically connected to wires 128. The transparent electrodes 115 and the transparent electrodes 122 are perpendicular to each other, a number of pixels aligned in matrix are formed at the crossing areas at which the two types of transparent electrodes cross each other, and these pixels thus aligned constitutes a liquid crystal display area A.

The first substrate 111 has a portion 110T which extends beyond a side of the second substrate 121, and on the substrate extended portion 110T, there are provided the wires 118A described above, wires 118B electrically connected to the wires 128 via a vertical conductive portion formed of part of the sealing material 130, and an input terminal portion 119 composed of a plurality of wiring patterns which are formed independently of each other. In addition, on the substrate extended portion 110T, a semiconductor IC 161 having a driver circuit for driving liquid crystal is mounted so as to be electrically connected to the wires 118A and 118B, and the input terminal portion 119. Furthermore, on the end portion of the substrate extended portion 110T, a flexible circuit board 163 is mounted so as to be electrically connected to the input terminal portion 119.

In this liquid crystal panel 100, as shown in FIG. 2(a), a polarizer 140 is provided on the external surface of the first substrate 111, and a polarizer 150 is provided on the external surface of the second substrate 121. The polarizer 140 and the polarizer 150 are adhered to the external surfaces of the substrates so as to be placed in, for example, the crossed Nicols arrangement in which the polarization axes are substantially perpendicular to each other.

Structure of Color Filter Substrate 110

Next, referring to FIGS. 2(a) and (b), the structure of the color filter substrate 110 will be described in detail. On the surface of the first substrate 111, color layers 112 are formed, and a surface protective layer (an overcoat layer) 113 composed of a transparent resin or the like is formed thereon. By the color layers 112 and the surface protective layer 113, a color filter is formed.

The color layers 112 are generally formed so as to exhibit a predetermined color tone by dispersing a coloring agent, such as a pigment or a dye, in a transparent resin. As an example of a color tone of the color layer, a combination of three colors, R (red), G (green), and B (blue), may be mentioned as the primary color filter; however, the color tone is not limited thereto, and various color tones may also be formed of complementary colors and the like. Typically, a color resist composed of a photosensitive resin containing a coloring agent, such as a pigment or a dye, is applied over the surface of a substrate, and unnecessary parts of the color resist are removed by a photolithographic method, whereby color layers having a predetermined color pattern are formed. In the case in which a plurality of color layers having different color tones are formed, the steps described above are repeated. In the example shown in FIG. 2(b), a stripe arrangement is used as an aligned pattern of the color layers; however, in addition to this stripe arrangement, various arrangement, such as a delta arrangement or an inclined mosaic arrangement, may be used. In addition, around the peripheries of the color layers RGB described above, shading films (black matrix or black mask) for shading areas between the pixels may be formed as part of the color layers.

The surface protective layer 113 is provided so as to protect the color layers, to prevent the leakage of the coloring agent, and to planarize the surface of the color filter. As a material for the surface protective layer 113, for example, a transparent resin, such as an acrylic resin or an epoxy resin, may be used.

On the surface of the color filter, an insulating film 114 composed of a transparent metal oxide is formed. As the insulating film 114, a metal oxide which comprises at least one of $Ta_2O_5$, $ZrO_2$, and $TiO_2$ as a primary component and which is deposited by sputtering on the color filter may be mentioned. Among these mentioned above, a metal oxide composed of $Ta_2O_5$ itself or composed of $Ta_2O_5$ mixed with at least one of $ZrO_2$, $TiO_2$, and $SiO_2$ is particularly preferable.

On the surface of the insulating film 114, the transparent electrodes 115 each having a predetermined patterned shape are formed. The transparent electrodes 115 are composed of a transparent conductor such as ITO. On the surfaces of the transparent electrodes 115, a rigid protective film (a transparent film for preventing short-circuiting between the top and the bottom electrodes caused by intrusions of foreign materials such as dust) 116 composed of $SiO_2$, $TiO_2$, or the like is formed, and on the surface of this rigid protective film 116, an alignment film 117 composed of a polyimide resin or the like is formed by coating. For the alignment film 117, known rubbing treatment is performed.

Opposing Substrate and Panel Structure

On the surface of the second substrate 121, transparent electrodes 122 composed of ITO or the like are formed as is the case described above, and on the surfaces thereof, a rigid protective film 123 and an alignment film 124, similar to those described above, are formed in this order. Known rubbing treatment is also performed for the alignment film 124.

The color filter substrate 110 and the opposing substrate 120 are adhered to each other by the sealing material 130 which is provided on one of the substrates described above and are then bonded together by applying a pressure so as to have a predetermined gap (a cell gap) between the substrates, in which the gap is controlled by spacers dispersed between the substrates or spacers mixed in the sealing material 130 (both spacers are not shown in the figure). Subsequently, the sealing material 130 is cured by heating, light irradiation, or the like, thereby forming a cell structure shown in the figure. As shown in FIG. 1, the liquid crystal 132 is injected into the cell via the opening portion 130a provided in part of the sealing material 130, and subsequently, the opening portion 130a is sealed by a resin or the like, whereby the liquid crystal panel 100 is formed.

Details of Method for Manufacturing Color Filter Substrate

Figure 3:
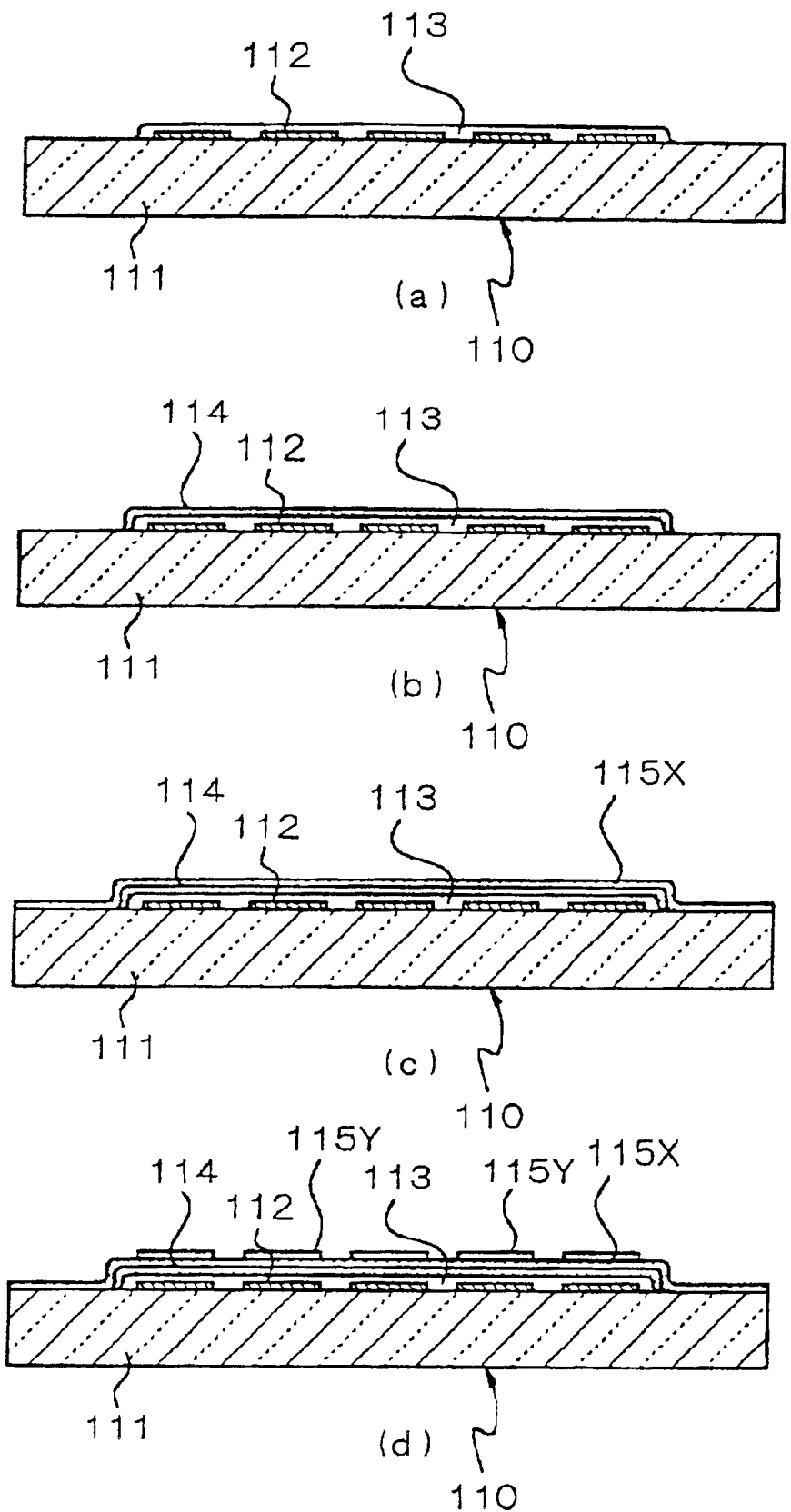
FIGS. 3(a) to 3(d) are cross-sectional views showing manufacturing steps of the color filter substrate forming the liquid crystal according to the first embodiment.

Next, the details of a method for manufacturing the color filter 110 will be described in detail with reference to FIGS. 3(a) to (d). First, as shown in the FIG. 3(a), after the color filter composed of the color layers 112 and the surface protective film 113 is formed by the method described above, on the surface of the surface protective film 113, the insulating film 114 is formed as shown in FIG. 3(b). As a method for forming the insulating film 114, various PVD or CVD methods may be used; however, in particular, a PVD method, such as a sputtering method, a deposition method, or an ion plating method, may be preferably used. When a sputtering method is used, a target is used which is formed by sintering a polycrystalline powder of $Ta_2O_5$, $ZrO_2$, or $TiO_2$, or the like obtained by pulverization. In this step described above, in accordance with a film composition desired for the insulating film 114, the target can be formed by adjusting a powder composition.

Next, as shown in FIG. 3(c), a transparent conductive layer 115X composed of ITO is formed by a sputtering method. The conductivity and the refractive index of ITO is significantly changed by the film composition and the film-forming conditions; however, in general, the composition thereof and the conditions therefor are primarily determined in view of the electrical properties of the conductive film obtained by film formation. The transparent conductive layer 115X is first formed on the entire surface of the first substrate 111. Subsequently, a photosensitive resist is applied over the transparent conductive layer 115X, exposure treatment was performed on this photosensitive resist by using a predetermined exposure pattern, and development is then performed by using an alkaline solution such as an aqueous solution containing potassium hydroxide (for example, at a concentration of 0.9%), whereby, as shown in FIG. 3(d), predetermined resist patterns 115Y are formed. Next, etching is performed over this resist pattern 115Y by using an etchant such as hydrochloric acid so as to etch the transparent conductive layer 115X, thereby forming the transparent electrodes 115 shown in FIG. 2(a). Subsequently, the resist pattern 115Y on the transparent electrodes 115 is removed by using an alkaline solution (for example, an aqueous solution containing potassium hydroxide at a concentration of 1.5%) having a higher concentration (alkalinity) than that used in development.

In the steps described above, since an alkaline solution is used when the transparent electrodes 115 are formed by patterning the transparent conductive layer 115X, when the insulating film 114 formed under the transparent electrodes 115 has poor alkali resistance, the surface of the insulating film 114 is etched, and as a result, a problem in that the patterning accuracy is degraded due to the generation of side etching of the transparent electrodes 115, the transparent electrodes 115 are separated from the insulating film 114, or the insulating film 114 itself is separated from the surface of the surface protective layer 113 may occur in some cases.

In this embodiment, since the insulating film 114 is formed of a material having high alkali resistance, such as $Ta_2O_5$ or $ZrO_2$, the insulating film 114 is scarcely damaged by an alkaline solution used during patterning, more particularly, by an alkaline solution used for removing (stripping) the resist pattern 115Y, and hence, the problem described above may not occur.

In order to evaluate the alkali resistance of the insulating film 114 of this embodiment, a durability test thereof was performed. This durability test used color filters, similar to that described above, formed on a glass substrate. An insulating film 114 approximately 400 Å thick comprising $Ta_2O_5$ as a primary component was formed by sputtering on the surface of the color filter described above, and an insulating film, having an approximately equivalent thickness described above and composed of $SiO_2$, was formed by sputtering on the color filter in a manner equivalent to that described. In order to perform the durability test described above, the substrates thus formed were immersed in an aqueous solution containing potassium hydroxide at a concentration of 1.5% (an alkaline solution used for removing the resist pattern 115Y) for an equivalent length of time.

According to the results of this durability test, it is understood that in the substrate having the insulating film composed of $SiO_2$ formed thereon, the insulating film was separated from the surface of the surface protective layer of the color filter, and in the color filter substrate of this embodiment having the insulating film 114 comprising $Ta_2O_5$ as a primary component formed thereon, the separation between the insulating film 114 and the surface protective layer 113 did not occur at all.

Optical Structure of Color Filter Substrate

Next, an optical structure of the color filter substrate 110 of this embodiment will be described. In the color filter substrate 110, the insulating film 114 is formed on the color filter as shown in FIG. 2(a), and the transparent electrodes 115 are formed on the insulating film. Areas at which these transparent electrodes 115 and the transparent electrodes 122 opposing thereto overlap each other in plan view with the liquid crystal 132 provided therebetween are pixel areas, and each pixel area is formed so as to independently control the orientation of the liquid crystal, whereby a desired display can be performed in accordance with the optical states in the individual pixel areas. Accordingly, the optical properties of the entire liquid crystal panel 100 are determined by the optical properties of the individual pixel areas described above.

The optical properties of each pixel area are determined by a laminated structure composed of the first substrate 111, the color layer 112 of the color filter, the surface protective layer 113 of the color filter, the insulating film 114, and the transparent electrode 115; and by the optical properties of the opposing substrate 120. The refractive index of the conventional insulating film composed of $SiO_2$ is approximately 1.455 in the visible wavelength region, and the refractive index of the transparent electrode 115 is approximately 1.8 to 1.9. The refractive index of this transparent electrode 115 is significantly changed by the composition or the film-forming conditions; however, since the electrical properties, such as electrical resistivity, are largely influenced by the composition and the film-forming conditions, in general, it has been difficult to freely design the refractive index.

Incidentally, it is possible to form $Ta_2O_5$, $ZrO_2$, and $TiO_2$ so as to have a high refractive index, such as more than 2.0, and in addition, as has been well known, when these are formed by a vapor phase film-forming method, by changing a partial pressure of oxygen and other film-forming conditions during film formation, the refractive index thereof can be significantly changed. In this embodiment, since the insulating film 114 comprises at least one of $Ta_2O_5$, $ZrO_2$, and $TiO_2$ as a primary component, the refractive index thereof can be higher than that of the conventional insulating film ($SiO_2$: a refractive index of 1.455), and by adjusting the composition, it is possible to make the refractive index of the insulating film close to that of the transparent electrode 115. For example, by changing the film-forming conditions, or by forming an insulating film 114 composed of at least one of $Ta_2O_5$, $ZrO_2$, and $TiO_2$ mixed with another material such as $SiO_2$, the refractive index of the insulating film 114 can be controlled in the range of 1.6 to 2.0, and as a result, reflection at the interface of the insulating film 114 and the transparent electrode 115 can be reduced so as to increase effective light transmittance of the pixel area. In particular, in the range described above, the refractive index is preferably controlled in the range of 1.7 to 1.95.

As a particular example relating to that described above, the insulating film 114 was formed by sputtering using a target used in a sputtering apparatus, which was formed by sintering powdered $SiO_2$ and powdered $ZrO_2$ mixed therewith at a content of 50 wt %, respectively. The insulating film 114 thus formed had a refractive index of approximately 1.8 which was approximately equal to that of the transparent electrode 115. As a result, the reflection at the interface between the insulating film 114 and the transparent electrode 115 substantially did not occur, and these two layers could be optically regarded as a single layer, whereby optical design could be easily performed. In addition, it was confirmed that the insulating film having the composition described above also had sufficient alkali resistance during the manufacturing process.

In addition, when the insulating film was formed by using a mixed material composed of $SiO_2$ and $ZrO_2$, an abnormal discharge did not occur at all even when a voltage was applied thereto which was approximately two times the voltage at which an abnormal discharge occurred when a target containing only $SiO_2$ was used as a film-forming material. Furthermore, in addition to the target described above, in a target comprising at least one of $Ta_2O_5$, $ZrO_2$, and $TiO_2$ as a primary component, an abnormal discharge was unlikely to occur compared to the target containing only $SiO_2$ as a film-forming material, and hence, stable film-forming conditions could be obtained.

In the target materials described above, compared to conventional target materials, the generation of particles was unlikely to occur, and hence, when the inside of a sputtering apparatus was exposed to air, the amount of particles spread to the environment could be substantially decreased to zero. In particular, in a target primarily composed of $Ta_2O_5$ as a film-forming material, since the adhesion of the film-forming material to an adhesion-preventing plate was superior, the film-forming material adhered to the inside wall of the apparatus was not separated therefrom, and even when the adhesion-preventing plate was replaced every week, the generation of particles hardly occurred. In contrast, even when the adhesion-preventing plate was replaced every three days in the case in which a conventional target composed of $SiO_2$ was used, the generation of particles occurred whenever the adhesion-preventing plate is replaced.

In this embodiment, when the optical thickness of a laminated portion formed of the insulating film 114 and the transparent electrode 115 is set so as to be equal to the product of $1/2\lambda$ and a natural number, the optical loss caused by the laminated portion described above can be decreased, and hence, the light transmittance of the pixel area can be increased.

For example, in the case in which a standard wavelength $\lambda$ of the visible light is 550 mm, the insulating film 114 is formed of $ZrO_2$—$SiO_2$-based material so as to have a refractive index $n_1$ of 1.8, and the transparent electrode 115 is formed so as to have a refractive index $n_2$ of 1.9, when the insulating film 114 is formed so as to have a thickness $d_1$ of 500 Å (50 nm), and the transparent electrode 115 is formed so as to have a thickness $d_2$ of approximately 1,000 Å (100 nm), the optical thickness OT satisfies the equation, $OT = n_1 \cdot d_1 + n_2 \cdot d_2 = 270$ nm, whereby the optical thickness can be approximately equal to $1/2\lambda = 275$ nm.

When the optical thickness satisfies the equation, $OT = 1/2\lambda$, an effect can be visually obtained when the wavelength $\lambda$ is the standard wavelength described above and, in addition, when the wavelength $\lambda$ is an optional wavelength in the visible wavelength region. The visible wavelength region is a region in which the wavelength is in the range of from 380 nm to 780 nm.

In addition, when the refractive index $n_1$ of the insulating film 114 is made to be approximately equal to the refractive index $n_2$ of the transparent electrode 115 in accordance with the method described above, the insulating film 114 and the transparent electrode 115 can be optically regarded as an integral unit. Accordingly, since the total thickness d of the insulating film 114 and the transparent electrode 115 may be controlled so as to substantially satisfy the equation, $n \cdot d = 1/2\lambda$, the degree of freedom of design for the film thickness can be further increased.

As the thickness of the color filter substrate 110, for example, the color layer 112 approximately 0.5 to 2 $\mu$m thick, the surface protective layer 113 approximately 1 to 2 $\mu$m thick, the insulating film 114 having a thickness of 100 to 1,000 Å (10 to 100 nm), and the transparent electrode 115 having a thickness of 1,000 to 3,000 Å (100 to 300 nm) are preferably formed. When the insulating film has a thickness in the range described above, by virtue of the corrosion resistance thereof, the color filter (the color layer) thereunder can be satisfactory protected, and in addition, the adhesion of the transparent electrode can also be improved. In addition, the individual layers constituting this laminated structure can be formed under stable conditions, respectively. Furthermore, when the transparent electrode 115 has a thickness in the range described above, satisfactory electrical properties (wiring resistance and electrode resistance) can be obtained, and in addition, stable conditions can be obtained during film formation.

When the refractive index of the insulating film 114 is higher, the thickness thereof can be smaller. In particular, as described above, when the laminated portion formed of the insulating film and the transparent electrode is formed so as to have an optical thickness equal to the product of $1/2\lambda$ and a natural number, the thickness of the insulating film can be decreased since the refractive index thereof in this embodiment is larger than that of the conventional insulating film composed of $SiO_2$, an advantage can also be obtained in that the thickness of the laminated portion in the color filter substrate 110 can be decreased.

Second Embodiment

Next, a second embodiment differing from the embodiment described above will be described with reference to FIGS. 4(a) and (b). A liquid crystal device of this second embodiment is a liquid crystal device provided with a liquid crystal panel 200 shown in FIG. 4(a), and this liquid crystal panel 200 is formed by adhering a color filter substrate 210 having a color filter to an opposing substrate 220 with a sealing material 230 provided therebetween. The liquid crystal 231 is enclosed between the substrates described above. Polarizers 240 and 250 adhered to the external surfaces of a first substrate 211 and a second substrate 221, respectively, are equivalent to those described in the first embodiment.

In this embodiment, on the surface of the first substrate 211 composed of a glass, a synthetic resin, or the like, a color filter composed of color layers 212 and a surface protective layer 213 is formed in a manner similar to that described above, and on this color filter, an insulating film 214 comprising $Ta_2O_5$ as a primary component is formed by a sputtering method or the like. A material for forming this insulating film 214 may be substantially $Ta_2O_5$ itself or may be a mixture of $Ta_2O_5$ and another material (particularly, a metal oxide), such as $ZrO_2$, $TiO_2$, or $SiO_2$.

On the insulating film 214, strip-shaped transparent electrodes 215 similar to those described above are formed as shown by chain lines in FIG. 4(b), and on the transparent electrodes, a rigid protective film 216 and an alignment film 217 are sequentially formed.

Figure 4:
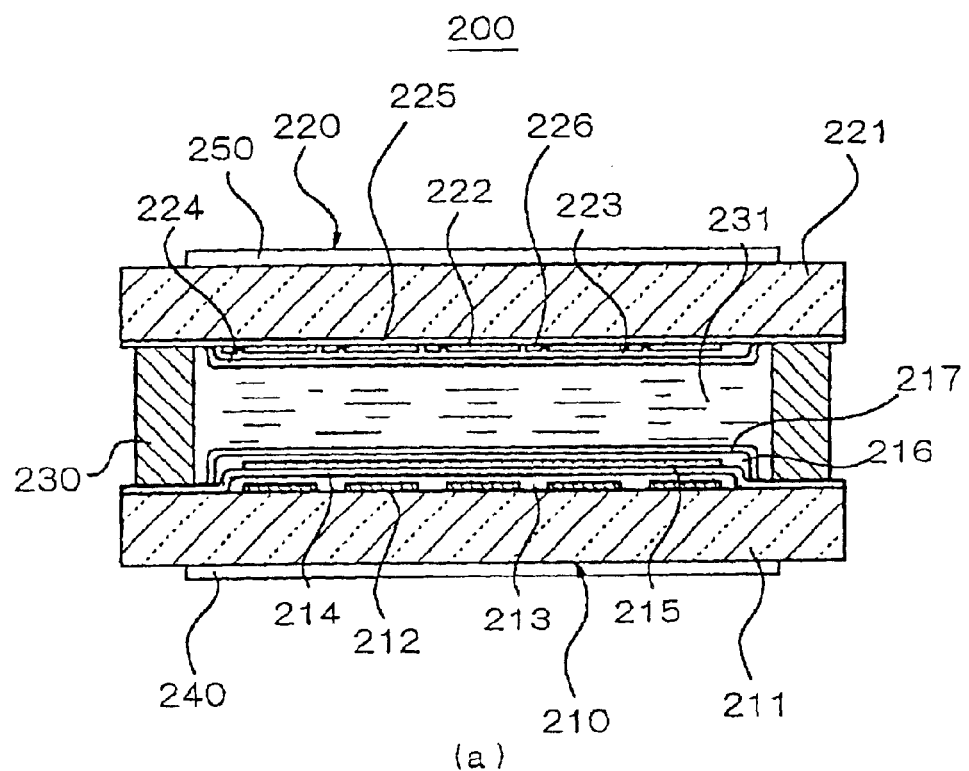
FIG. 4 includes a rough cross-sectional view (a) schematically showing the structure of a liquid crystal panel and a rough expanded plan view (b) schematically showing the structure of a color filter substrate according to a second embodiment of a liquid crystal device and a color filter substrate of the present invention.
Figure 4:
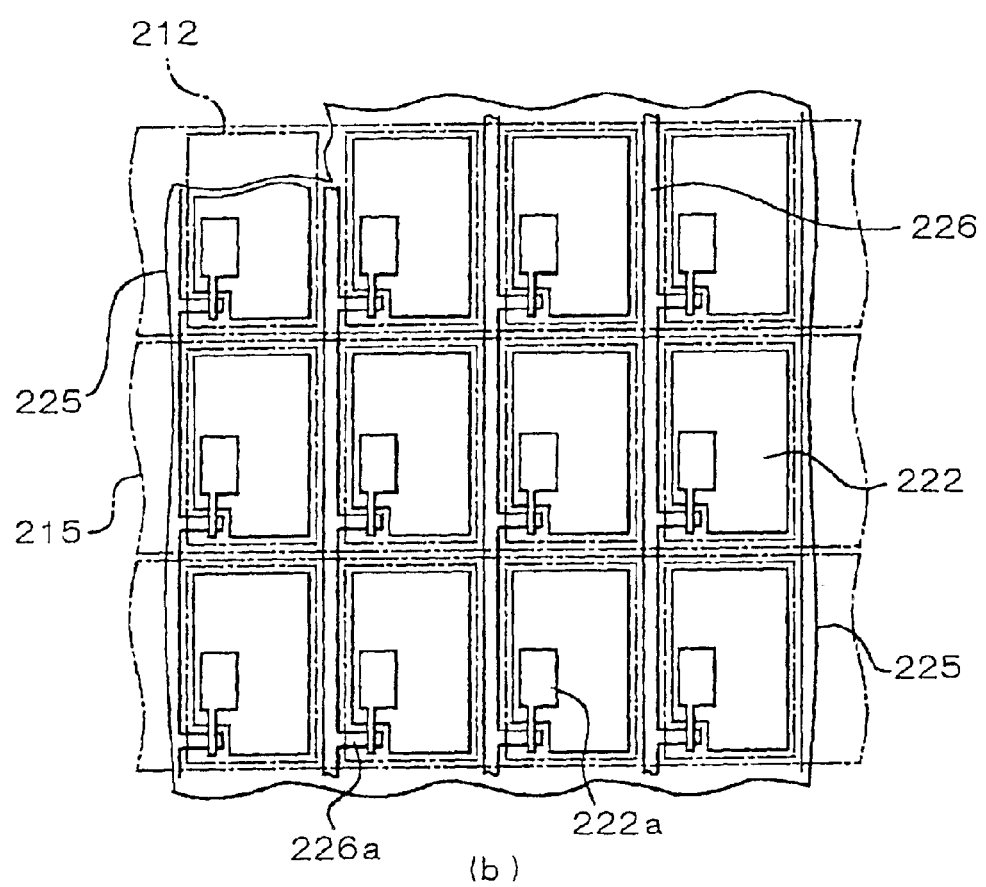

In addition, in the opposing substrate 220, on the surface of the transparent second substrate 221 composed of a glass, a synthetic resin, or the like, an underlying layer 225 comprising $Ta_2O_5$ as a primary component is formed by a sputtering method or the like. On this underlying layer 225, wiring layers 226 composed of Ta or a Ta alloy are formed. Next, as shown in FIG. 4(b), the surfaces of the wiring layers 226 are oxidized by anodization or the like so as to form thin insulating oxide films, and electrode layers 222a composed of another metal, such as Cr or Al, are formed on the insulating oxide films on pixel connecting portions 226a provided at individual pixels, whereby two-terminal active elements (diode elements), which are TFD's (Thin Film Diode) having a metal/insulating material/metal (MIM) structure, are formed.

In addition, on the underlying layer 225 of the second substrate 221, transparent electrodes 222 are formed in the individual pixels, and the electrode layers 222a described above are also formed on the transparent electrodes 222. According to the structure described above, the active element described above is electrically connected to the wiring layer 226 and the transparent electrode 222 in each pixel. Furthermore, on these wiring layers 226 and the transparent electrodes 222, rigid protective film 223 and an alignment film 224 are sequentially formed, which are similar to those described above.

The underlying layer 225 described above is formed so as to improve the adhesion of the wiring layers 226 and, in addition, to prevent the impurities in the second substrate 221 from diffusing to the active elements described above or the like.

In the case in which this liquid crystal panel 200, when the insulating film 214 and the underlying layer 225 are formed simultaneously on the first substrate 211 and the second substrate 221, respectively, using the same material, the number of steps of the manufacturing process of the liquid crystal panel can be reduced. In addition, in the case in which substantially the same material is used for forming the insulating film 214 and the underlying layer 225, when the insulating film 214 and the underlying layer 225 have the same composition and are formed independently, or when the insulating film 214 and the underlying layer 225 have different compositions from each other and are formed independently, apparatuses used in the manufacturing line can be used interchangeably, and as a result, the cost of equipment can be reduced. Furthermore, when exactly the same material is used, for example, the material can be commonly used, whereby the process control can be easily performed, or the material cost can be reduced.

Third Embodiment

Figure 5:
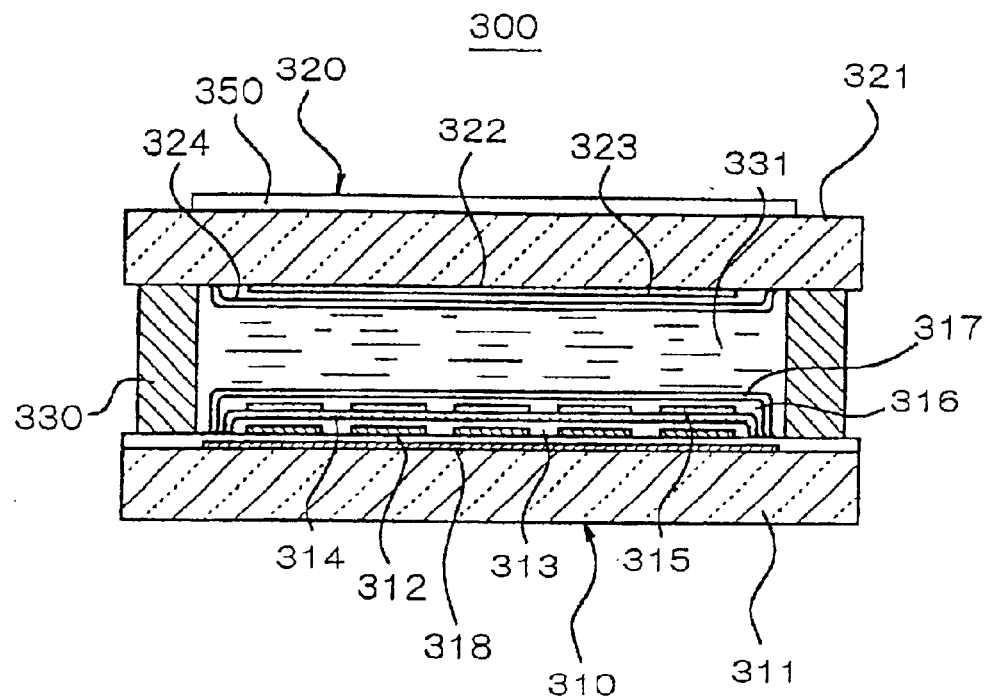
FIG. 5 includes a rough cross-sectional view (a) schematically showing the structure of a liquid crystal panel and a rough expanded plan view (b) schematically showing the structure of a color filter substrate according to a third embodiment of a liquid crystal device and a color filter substrate of the present invention.
Figure 5:
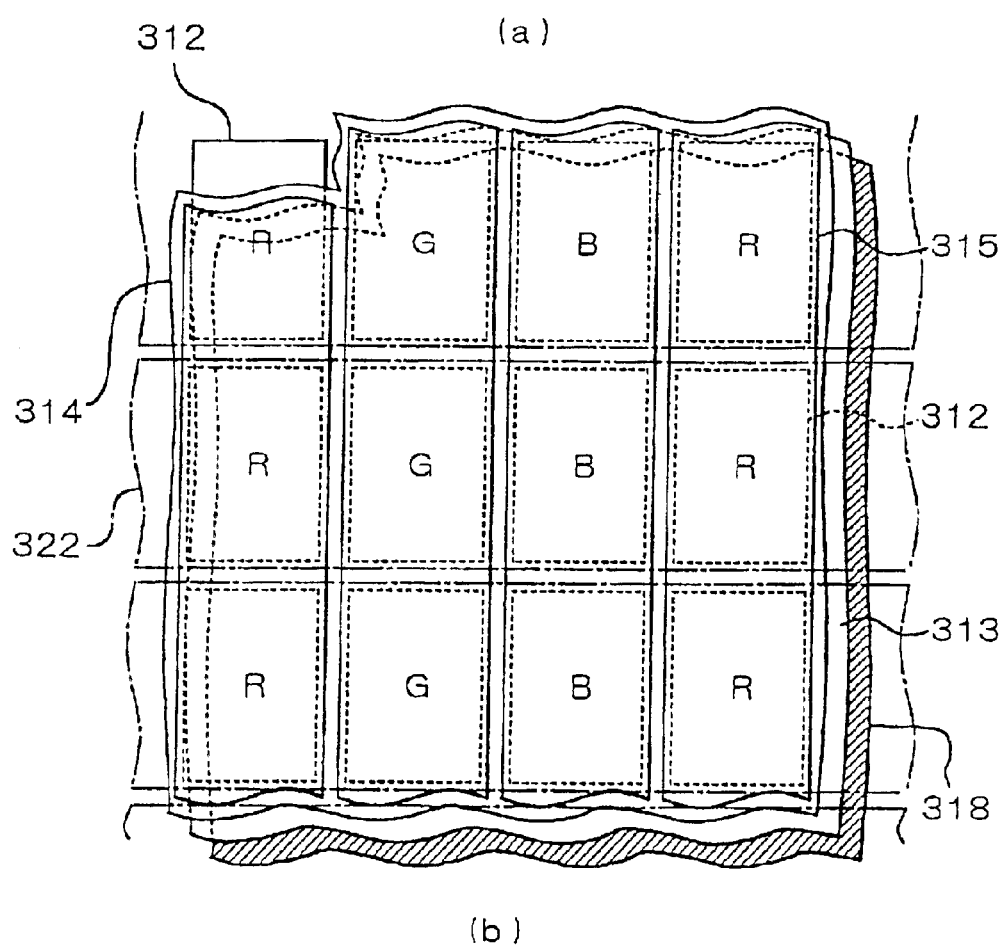

Next, a third embodiment of the present invention will be described with reference to FIGS. 5(a) and (b). A liquid crystal panel 300 of a liquid crystal device according to this embodiment primarily has a structure approximately equivalent to that of the liquid crystal panel 100 in the first embodiment. The structure comprises a color filter substrate 310 having a first substrate 311, color layers 312, a surface protective layer 313, an insulating film 314, transparent electrodes 315, a rigid protective layer 316, and an alignment film 317, which are similar to those described above; and an opposing substrate 320 having a second substrate 321, transparent electrodes 322, a rigid protective layer 323, and an alignment film 324, which are similar to those described above. In the structure described above, the color filter substrate 310 and the opposing substrate 320 are adhered to each other by a sealing material 330 provided therebetween, and liquid crystal 331 is enclosed between the substrates. A polarizer 350 is adhered to the external surface of the second substrate 321.

The liquid crystal panel 300 of this embodiment has a reflective panel structure in which a reflective layer 318 composed of a metal thin-film or the like is formed on the surface of the first substrate 311 of the color filter substrate 310. As a material for the reflective layer 318, there may be mentioned Al, an Al alloy, Cr, a Cr alloy, Ag, an Ag alloy, or the like. In addition, a color filter formed of the color layers 312 and the surface protective layer 313 is formed directly on the reflective layer 318 or is formed thereover with an optional transparent layer provided therebetween.

In this liquid crystal panel 300, ambient light incident on the polarizer 350 passes through the opposing substrate 320 and the liquid crystal 331, is incident on the color filter, is reflected at the reflective layer 318, again passes through the color filter and the liquid crystal 331, and emerges from the polarizer 350 via the opposing substrate 320. When a front light is provided at the front surface side (the upper side in the figure) of the opposing substrate 320, a structure can be formed in which display can be viewed by illuminating it with light emitted from the inside of the device in addition to ambient light.

In this reflective liquid crystal panel 300, since the display can be viewed by reflecting ambient light at the reflective layer 318, the display tends to be dark, and in particular, the brightness of the display tends to be insufficient due to the color filter through which ambient light passes. In this embodiment, since the insulating film 314 has a refractive index closer to that of the transparent electrode 315 compared to that previously used as described above, the light transmittances of the constituent elements other than the liquid crystal layer can be increased, and hence, brightness sufficient for performing display can be ensured. In particular, when the optical thickness of a laminated portion formed of the insulating film 314 and the transparent electrode 315 is controlled to be approximately equal to $1/2\lambda$ ($\lambda$ may be an optional wavelength in the visible wavelength region, i.e., 380 nm to 780 nm, and particularly, is preferably a standard wavelength 550 nm), the light transmittance can be improved.

Fourth Embodiment

Figure 6:
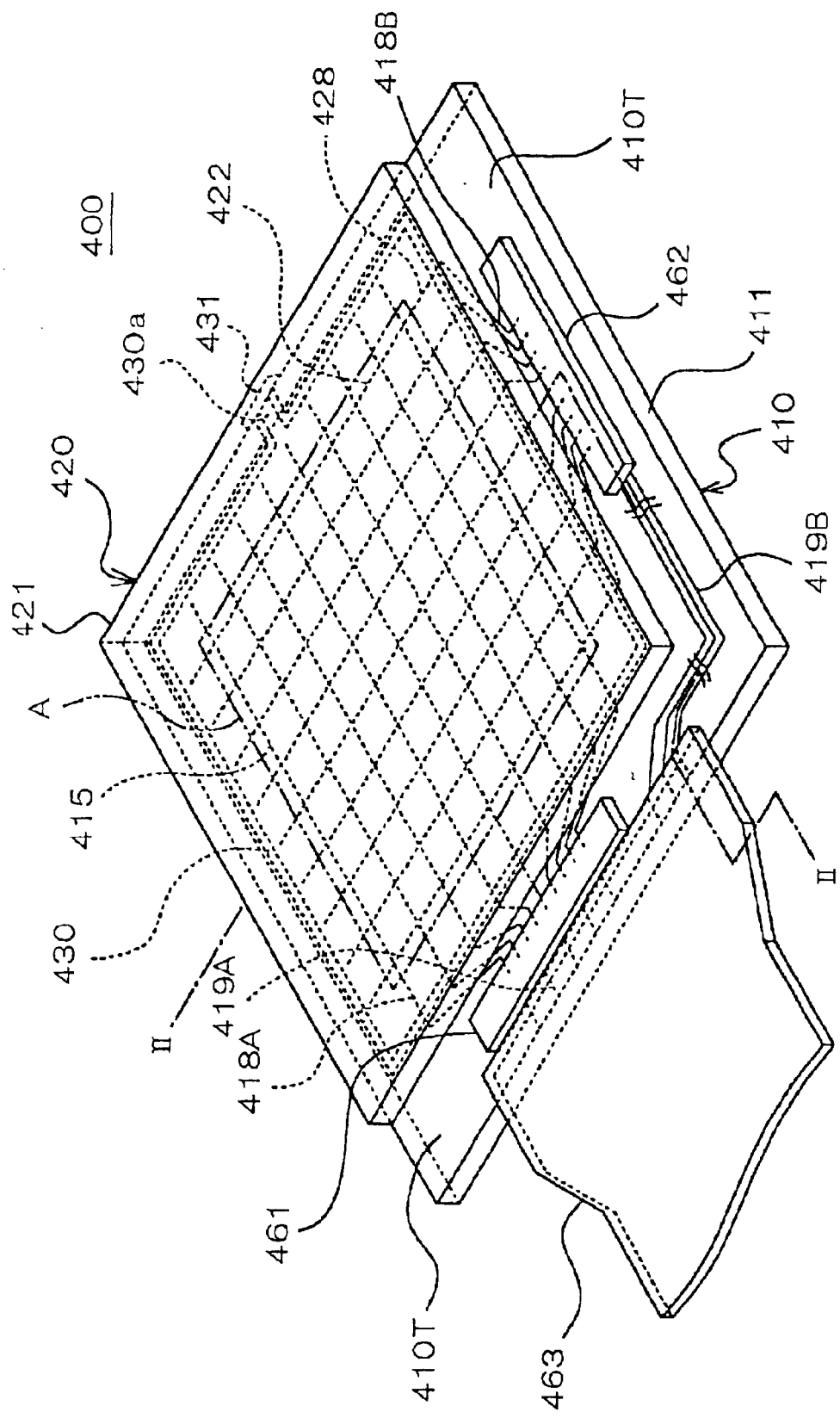
FIG. 6 is a rough perspective view showing the appearance of a liquid crystal panel according to a fourth embodiment of a liquid crystal device and a color filter substrate of the present invention.

Next, a liquid crystal device according to a fourth embodiment of the present invention will be more particularly described. In this embodiment, there is provided a liquid crystal panel 400 shown in FIG. 6. The liquid crystal panel 400 is a transflective and passive matrix liquid crystal panel which is formed by steps of adhering a reflective substrate 410 to an opposing substrate 420 by a sealing material 430, injecting, for example, TN (Twisted Nematic) type liquid crystal 440 via a liquid crystal inlet 430a provided in the sealing material 430, and sealing the liquid crystal inlet by an encapsulating material 431.

In the reflective substrate 410, a plurality of transparent electrodes 415 aligned in parallel like stripes are formed on a substrate 411 composed of a glass or a plastic, and in the opposing substrate 420, a plurality of transparent electrodes 422 aligned in parallel like stripes are formed on a substrate 421 similar to that described above. The transparent electrodes 415 and the transparent electrodes 422 are disposed perpendicular to each other, and pixel areas formed at the crossing areas of the two types of electrodes are aligned in a matrix, so that a liquid crystal display area A is formed. Wires 418A are connected to the transparent electrodes 415, and wires 428 are connected to the transparent electrodes 422.

The reflective substrate 410 has a portion 410T which extends beyond two sides of the opposing substrate 420 in an L-shape in plan view, and on the substrate extended portion 410T, semiconductor chips 461 and 462 are mounted. In addition, on the substrate extended portion 410T, the wires 418A connected to the transparent electrodes 415 extend as it is so as to be connected to the semiconductor chip 461. Furthermore, wires 418B are formed which are connected to the wires 428 for the transparent electrodes 422 via conductive particles 432 (see FIGS. 7 and 8) dispersed in the sealing material 430, and the wires 418B are electrically connected to the semiconductor chip 462. In addition, the semiconductor chip 461 is also electrically connected to wires 419A on the substrate extended portion 410T, and the semiconductor chip 462 is also electrically connected to wires 419B on the substrate extended portion 410T. These wires 419A and 419B are electrically connected to a flexible circuit board 463 mounted on the end area of the substrate extended portion 410T.

In the structural example described above, when the transparent electrodes 415 are designed as segment electrodes, and the transparent electrodes 422 are designed as common electrodes, the semiconductor chip 461 and the semiconductor chip 462 are designed so as to serve as a scanning line driving circuit and a signal line driving circuit, respectively. To the transparent electrodes 415 and the transparent electrodes 422, predetermined potentials are applied by the semiconductor chips 461 and 462 described above, and a predetermined voltage is applied to the liquid crystal 440 in each pixel area formed at the crossing point of the two types of electrodes.

Figure 7:
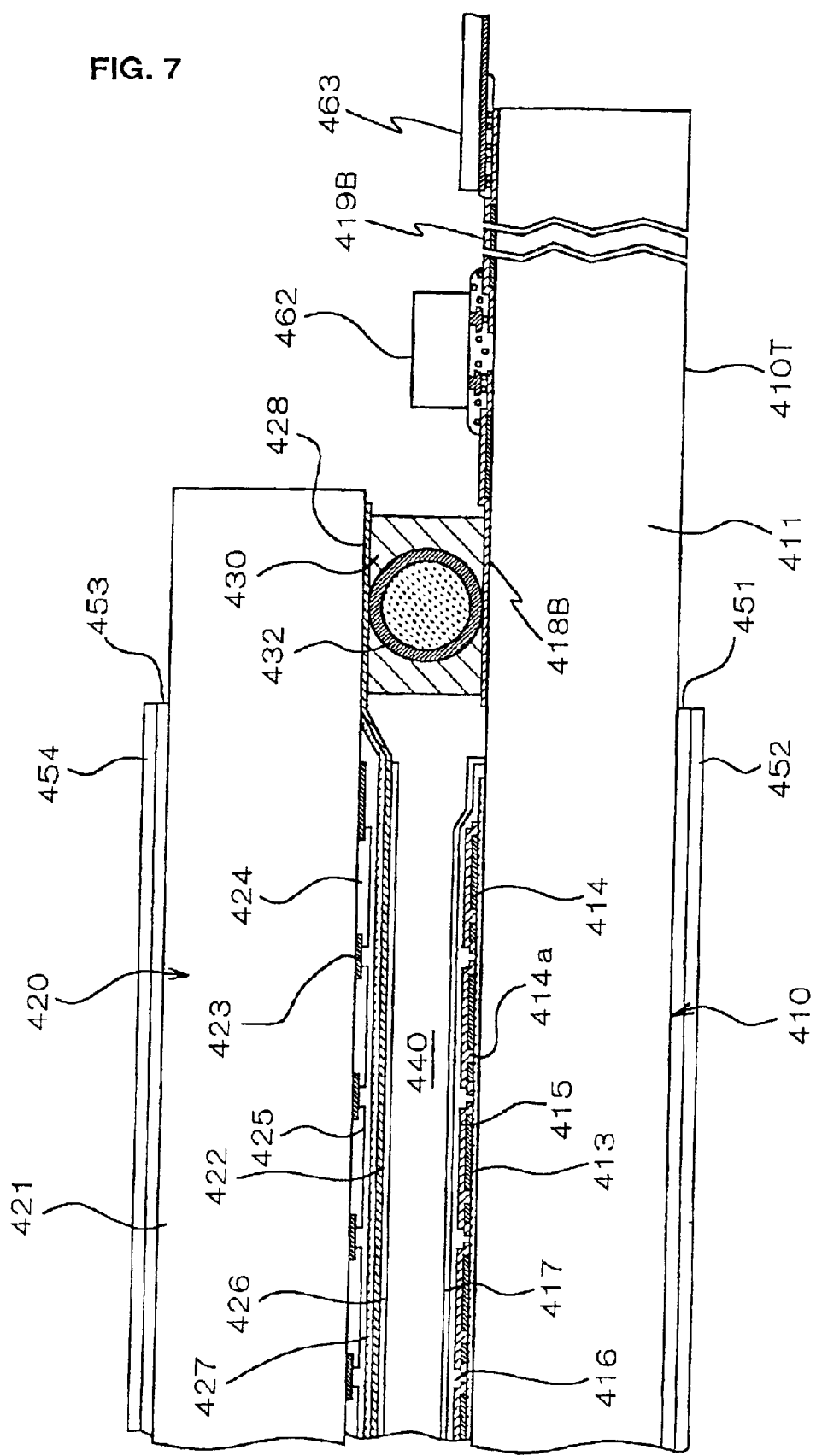
FIG. 7 is an expanded cross-sectional view of the liquid crystal panel (showing a state taken along the line II—II in FIG. 6) according to the fourth embodiment.
Figure 9:
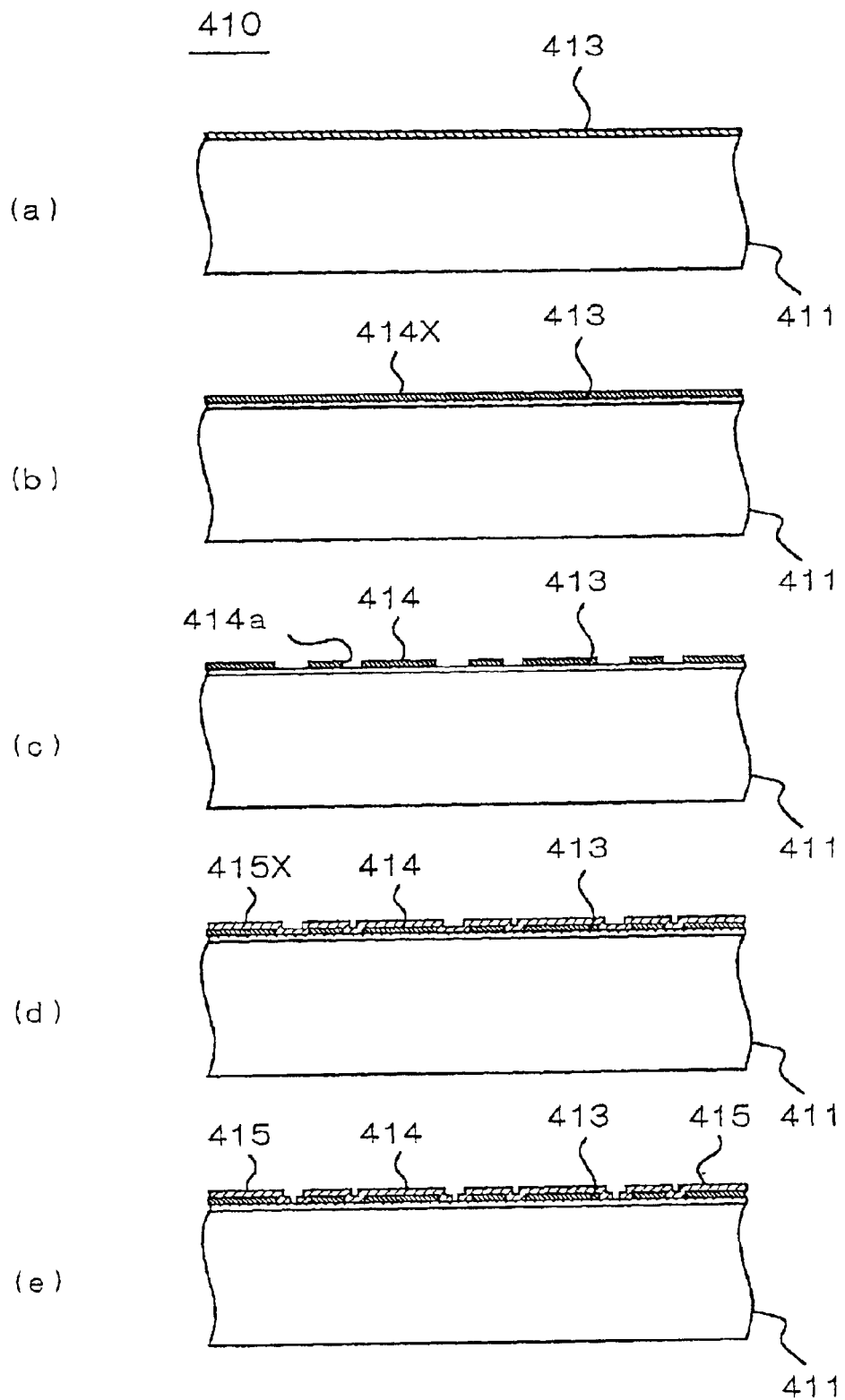
FIGS. 9(a) to 9(e) are cross-sectional views showing manufacturing steps of a reflective substrate according to the fourth embodiment.

As shown in FIG. 7, on the surface of the substrate 411, an underlying layer 413 containing $Ta_2O_5$, $ZrO_2$, $TiO_2$, or the like is formed. This underlying layer 413 is formed on an approximately entire surface of the substrate 411 as shown in FIG. 9(a) by a sputtering method or the like. The underlying layer 413 is formed so as to improve the adhesion between the substrate 411 and the transparent electrodes 415 and, in this embodiment, is preferably formed of the same material as that for an insulating film 427 provided on the opposing substrate 420, which is described later, by the same reason as that described in the third embodiment. That is, the underlying layer 413 may be formed of a material comprising one of $Ta_2O_5$, $ZrO_2$, and $TiO_2$ as a primary component, a material comprising at least two oxides described above as primary components, or a material comprising $Ta_2O_5$ as a primary component and at least one of $ZrO_2$, $TiO_2$, and $SiO_2$ mixed therewith.

On the surface of the underlying layer 413, reflective layers 414 composed of a silver metal or a silver alloy are formed. In the reflective layers 414, opening portions 414a are provided at each pixel area.

In addition to a silver metal, the reflective layers 414 may be formed of an alloy composed of silver, and palladium, copper, or gold (such as Ag—Pd (a silver content of 90 wt %), or Ag—Pd—Cu (a silver content of 95 wt %)). Since silver or a silver alloy has a higher reflectance than that of aluminum in the visible wavelength region, brightness of reflective display performed by the liquid crystal panel can be increased. As a material for forming the reflective layers, in addition to the silver and the silver alloy described above, another metal, such as aluminum, chromium, or the alloy thereof (such as Al—Nd), may be used.

Figure 8:
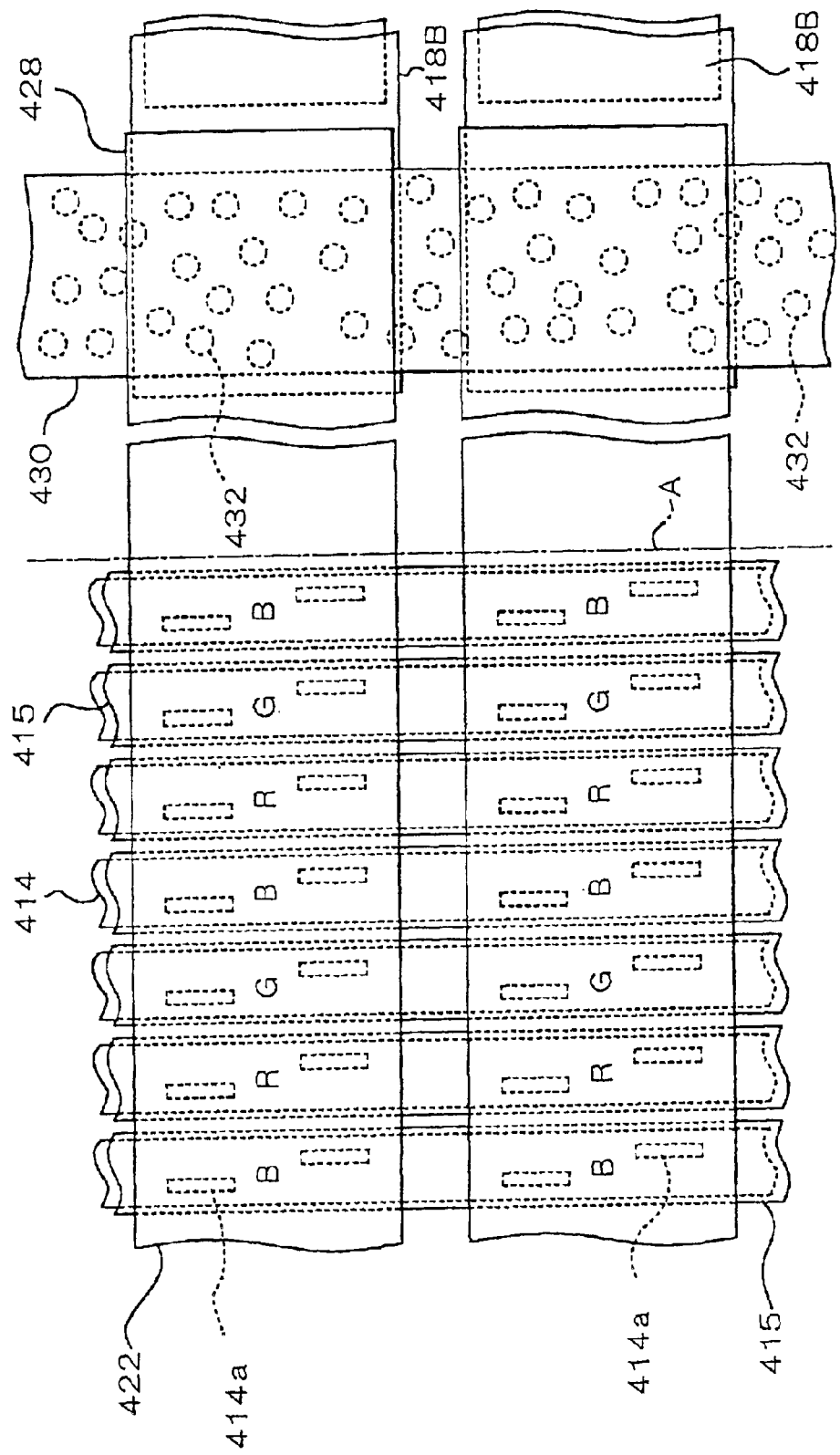
FIG. 8 is a partly expanded plan view showing a planar structure of major constituent elements for the liquid crystal panel according to the fourth embodiment.

After a metal film 414X composed of the metal or the alloy described above is formed over the entire underlying layer 413 as shown in FIG. 9(b) by a sputtering method, a deposition method, or the like, as shown in FIG. 9(c), the reflective layers 414 extending in a strip-shape are formed by patterning using a photolithographic method and an etching method so as to be overlapped by the transparent electrodes 415 formed in a subsequent step. In this step, one or at least two opening portions 414a are provided in the reflective layer 414 in each pixel as shown in FIG. 8.

On the entire reflective layer 414, a transparent conductive film 415X composed of ITO or the like is formed as shown in FIG. 9(d), and subsequently, patterning is performed by a photolithographic method and an etching method, thereby the transparent electrodes 415 are formed as shown in FIG. 9(e). The transparent electrodes 415 are formed each having a larger width than that of the reflective layer 414 so as to cover the entire reflective layers 414. In addition, both ends of the transparent electrode 415 in the width direction thereof extend beyond both edges of the reflective layer 414 so as to be in contact with the surface of the underlying layer 413, and as a result, the reflective layer 414 is formed so as to be enclosed by the underlying layer 413 and the transparent electrode 415.

Since the reflective layer 414 is enclosed by the underlying layer 413 and the transparent electrode 415 as described above, degradation, such as corrosion or the like, of the reflective layer 414 composed of a metal film can be prevented. In particular, when the reflective layer 414 is formed of silver or a silver alloy, the structure described above has a significant effect of preventing the reflective layer 414 from being degraded.

In the opposing substrate 420, shading films 423 are formed on the substrate 421, so that light leakage occurred between the pixels is prevented. The shading film 423 may be formed of a black resin layer (a black color layer) or a metal film composed of chromium or the like. As the black resin layer, for example, a transparent resin mixed with a black coloring agent such as powdered carbon in addition to a coloring agent, such as a red, a green, or a blue pigment or dye, may be mentioned. In addition, in each pixel area, as shown in FIG. 8, color layers 424, R (red), G (green), and B (blue), are formed so as to have predetermined aligned patterns, respectively.

On these shading films 423 and the color layers 424, a transparent surface protective layer 425 is formed, and on the surface of this protective film 425, an insulating film 427 is formed. This insulating film 427 is composed of the same material and is formed by the same method as those for the insulating films describe in the first to the third embodiments. On the insulating film 427, the transparent electrodes 422 composed of ITO are formed, and on the transparent electrodes, an alignment film 426 is further formed.

In the liquid crystal panel 400, as shown in FIG. 7, on the external surface of the substrate 411, a retardation film (a ¼-wavelength film) 451 and a polarizer 452 are sequentially formed, and on the external surface of the substrate 421, a retardation film (a ¼-wavelength film) 453 and a polarizer 454 are sequentially formed.

In this embodiment, after ambient light incident on the substrate 421 passes through the liquid crystal 440, the light is reflected at the reflective layers 414 and again passes through the liquid crystal 440, and then emerges from the substrate 421, whereby reflective display is realized. In addition, in the case in which a backlight or the like, which is not shown in the figure, is disposed at the back side of the substrate 411 so as to illuminate the liquid crystal panel 440, part of the illuminating light passes through the opening portions 414a provided in the reflective layers 414 and then passes through the liquid crystal 440, and the light subsequently emerges from the substrate 421, whereby transmissive display is also realized.

Fifth Embodiment

Finally, with reference to FIGS. 10 to 14, a fifth embodiment of the present invention will be described. A liquid crystal device of this fifth embodiment is provided with a liquid crystal panel having an appearance substantially identical to that described in the fourth embodiment. However, points differing from those in the fourth embodiment are that active elements are provided on one reflective substrate 510 forming the liquid crystal panel, and this reflective substrate 510 opposes a color filter substrate 520.

Figure 10:
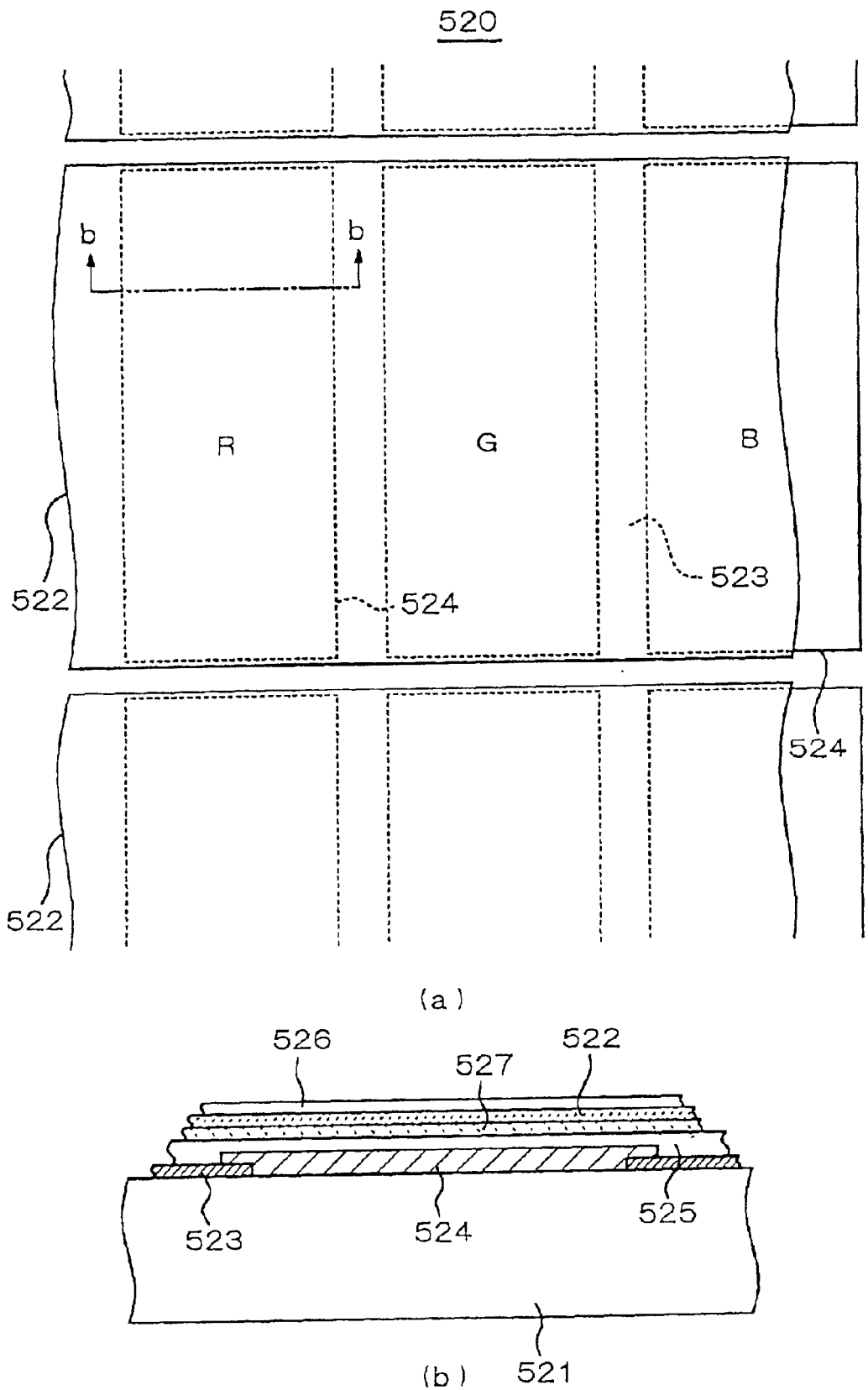
FIG. 10 is a rough expanded plan view showing a planar structure of a color filter substrate according to a fifth embodiment of a liquid crystal device and a color filter substrate of the present invention.
Figure 11:
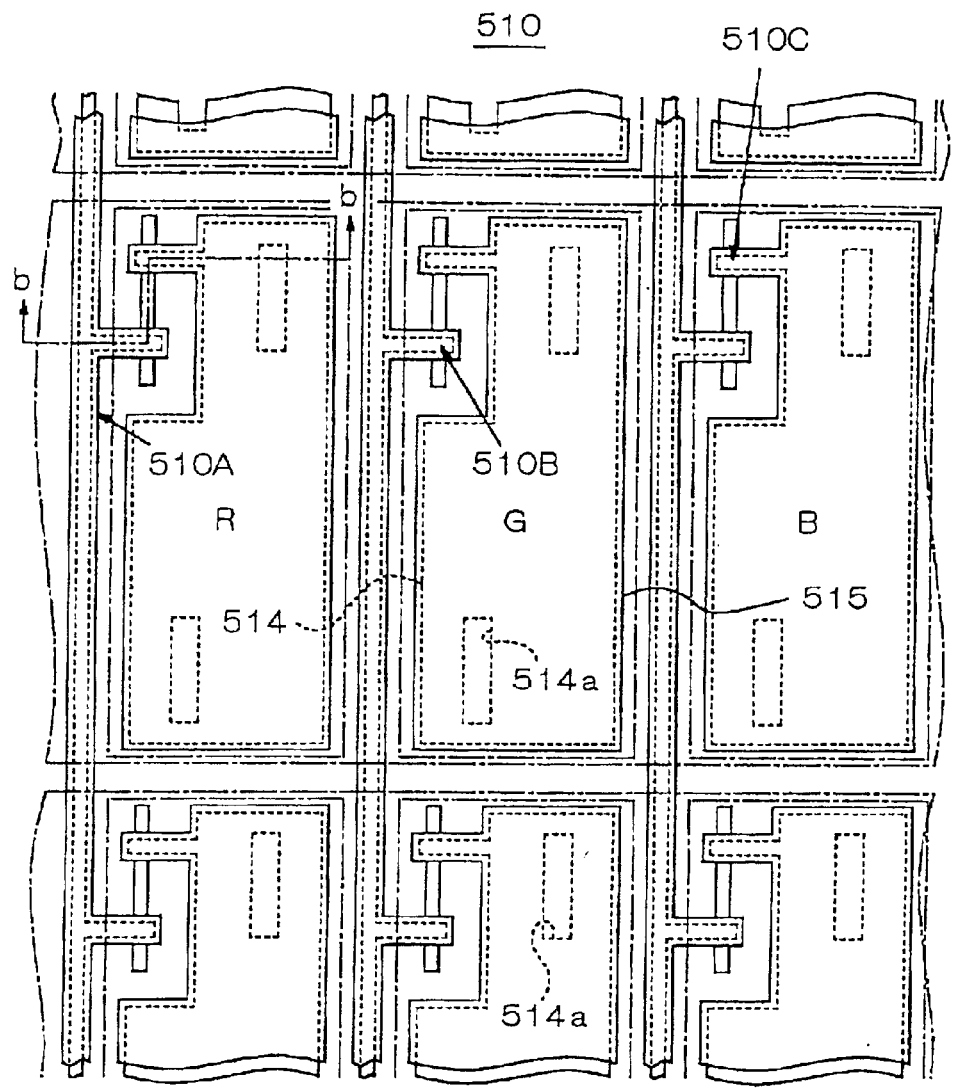
FIG. 11 is a rough expanded plan view showing a planar structure of a reflective substrate according to the fifth embodiment.
Figure 11:
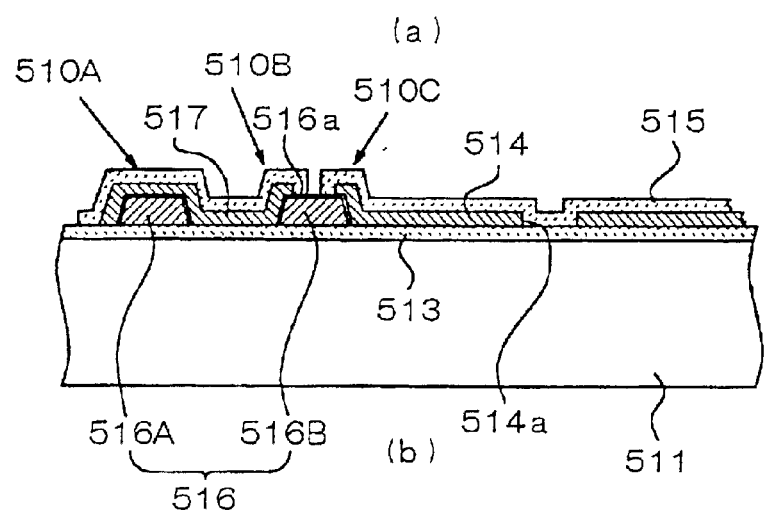

First, the color filter substrate 520 of this embodiment will be described with reference to FIG. 10. FIG. 10(a) is a partly expanded plan view of the opposing substrate 520, and FIG. 10(b) is a partly expanded cross-sectional view thereof.

In this color filter substrate 520, shading films 523 similar to those in the fourth embodiment are formed at areas between pixels on a substrate 521 composed of a glass or a plastic, and in addition, color layers 524 having respective colors, such as R, G, and B are formed in each pixel. On the shading films 523 and the color layers 524, a transparent surface protective layer 525 is formed. On the surface protective layer 525, as described in the individual embodiments described above, an insulating film 527 containing one of $Ta_2O_5$, $ZrO_2$, and $TiO_2$ is formed. This insulating film may contain one of $Ta_2O_5$, $ZrO_2$, and $TiO_2$ as a primary component as described above or may be composed of a mixture of at least two metal oxides described above. In addition, the insulating film may comprise $Ta_2O_5$ as a primary component and at least one of $ZrO_2$, $TiO_2$, and $SiO_2$ as a component added thereto.

On the insulating film 527, transparent electrodes 522 composed of a transparent conductive material such as ITO are formed. The transparent electrodes 522 are formed in a strip-shape so as to extend to the right and left in FIG. 10(a) and are aligned in parallel so as to have a stripe pattern as a whole. On the entire transparent electrodes 522, an alignment film 526 is formed.

Next, the reflective substrate 510 of this embodiment will be described with reference to FIG. 11(a). FIG. 11(a) is a partly expanded plan view of the reflective substrate 510, and FIG. 11(b) is a partly expanded cross-sectional view thereof.

In the reflective substrate 510, as shown in FIG. 11(a), a reflective layer 514 and a transparent electrode 515 in each pixel are formed so as to overlap the color layer 524 of the opposing substrate 520 in plan view. In addition, in the reflective layer 514, opening portions 514a in the form of a slit are provided. A wire 510A extending up and down is electrically connected to the reflective layer 514 and the transparent electrode 515.

As shown in FIG. 11(b), on a substrate 511, an underlying layer 513 is formed. This underlying layer 513 is formed of, as in the fourth embodiment, the same material as that for forming the insulating film 527 provided on the opposing substrate 520. In addition, on the underlying layer 513, a first metal layer 516 is formed, and this first metal layer 516 is composed of a wire portion 516A provided inside the wire 510A and an elemental portion 516B separated from the portion 516A. On the surface of the first metal layer 516, an insulating thin-film 516a is formed by anodization.

On the underlying layer 513 and the insulating thin-film 516a, a second metal layer is formed, part thereof is used as the reflective layer 514, and a remaining connecting portion 517 of the second metal layer connect the wire portion 516A of the first metal layer 516 and the elemental portion 516B. In addition, on the surfaces of these layers, a transparent conductive material such as ITO is formed, part thereof is used as the transparent electrode 515 so as to cover the reflective layer 514, and the remaining transparent conductive material is provided so as to cover the wire portion 516A and the connecting portion 517 described above.

In this embodiment, a diode element 510B is formed at which the wire 510A and the elemental portion 516B are connected to each other with the insulating thin-film 516a provided therebetween, and a diode element 510C is formed at which the elemental portion 516B and the reflective layer 514 are connected to each other with the insulating thin-film 516a provided therebetween. The diode elements 510B and 510C are non-linear elements having asymmetric electrical properties to each other. However, these two diodes are connected in series in which the connecting direction of the conductive materials with the insulating thin-film provided therebetween in one diode is opposite to that of the other diode, whereby these two diodes connected in series form one non-linear element having integrated symmetric electrical properties.

Figure 12:
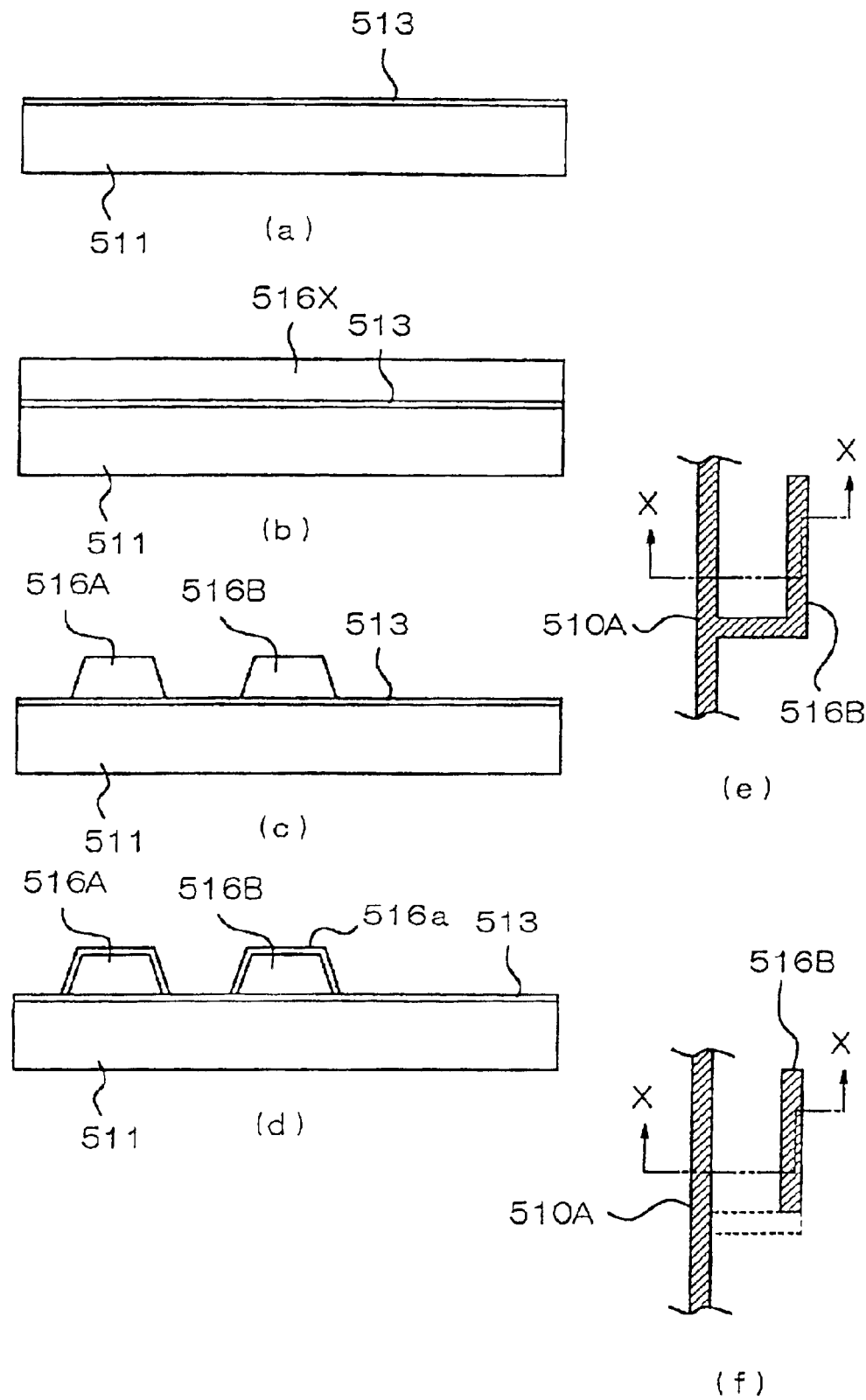
FIGS. 12(a) to 12(d) are cross-sectional views showing manufacturing steps of the reflective substrate according to the fifth embodiment.
FIGS. 12(e) and 12(f) are partly expanded plan views showing part of a planar pattern.
Figure 13:
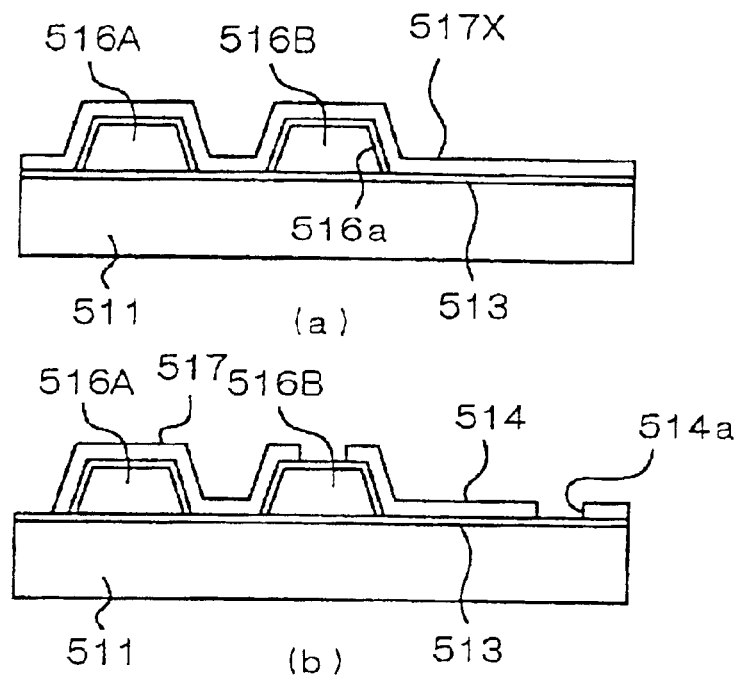
FIGS. 13(a) and 13(b) are cross-sectional views showing manufacturing steps of the reflective substrate according to the fifth embodiment.
FIG. 13(c) is a partly expanded plan view showing part of the planar pattern.
Figure 13:
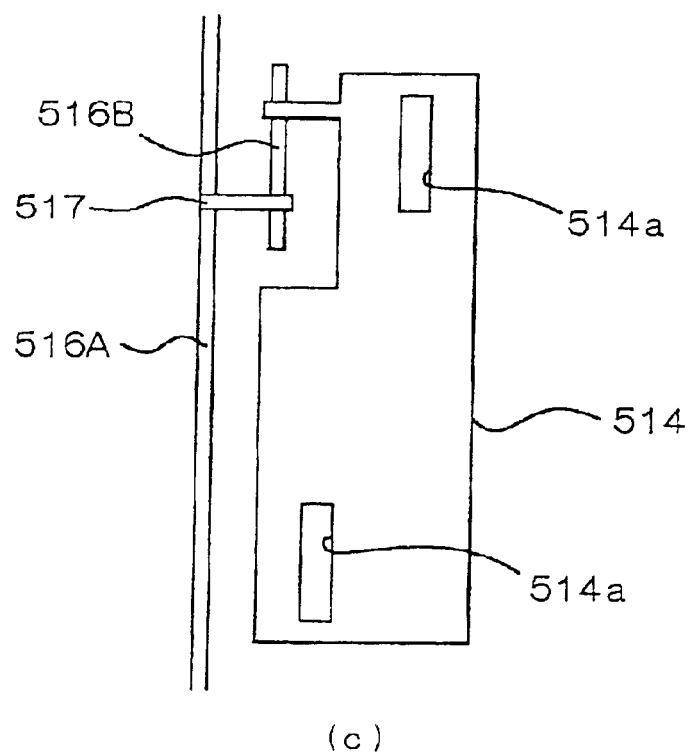
Figure 14:
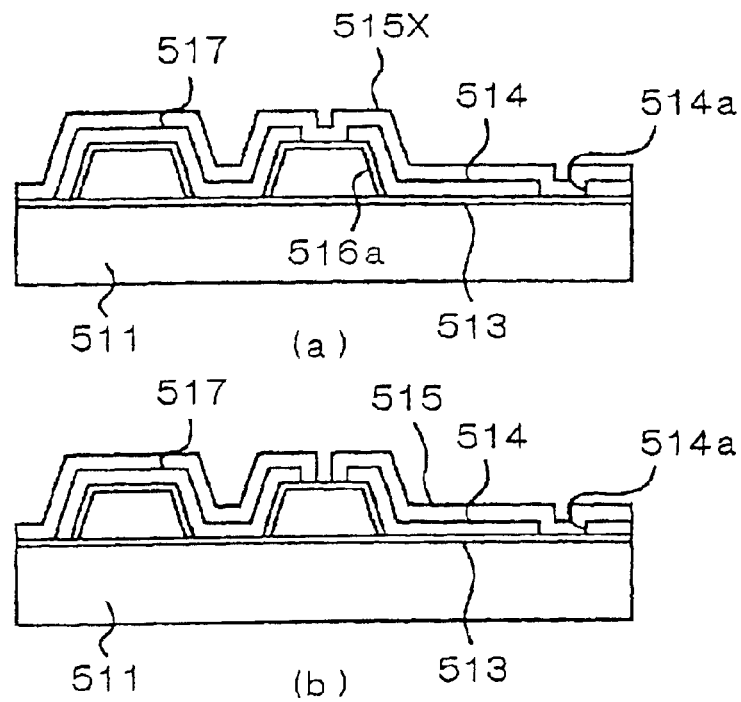
FIGS. 14(a) and 14(b) are cross-sectional views showing manufacturing steps of the reflective substrate according to the fifth embodiment.
FIG. 14(c) is a partly expanded plan view showing part of the planar pattern.
Figure 14:
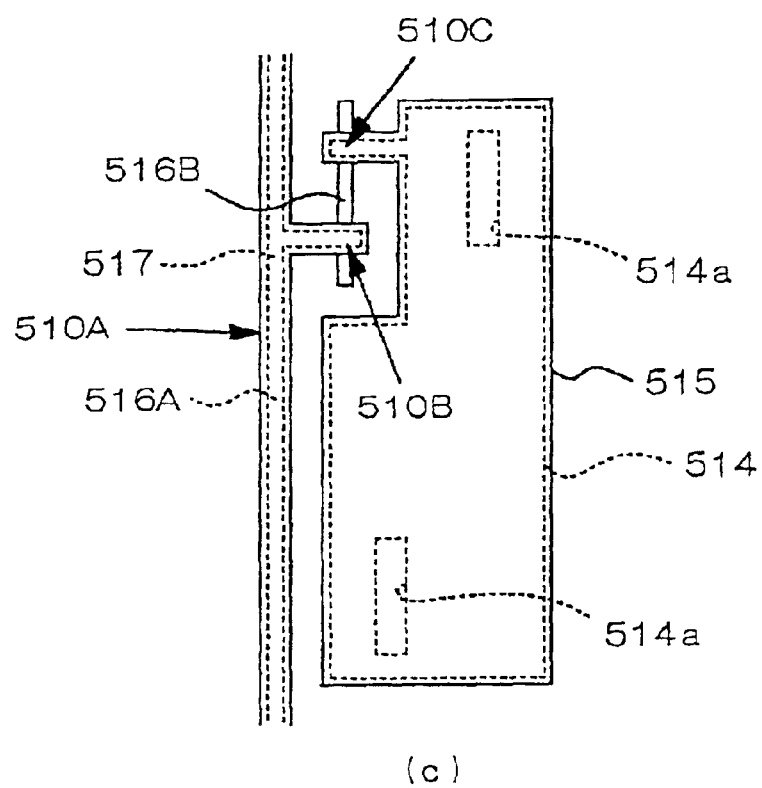

Next, referring to FIGS. 12 to 14, a process for manufacturing the reflective substrate 510 will be described in detail. As shown in FIG. 12(a), on the substrate 511, an underlying layer 513 comprising at least one of $Ta_2O_5$, $ZrO_2$, and $TiO_2$ as a primary component is formed. The underlying layer 513 can be formed by a sputtering method, a thermal oxidation method (an oxide is obtained by performing thermal oxidation on a metal film composed of Ta or the like formed by a deposition method or a sputtering method), or the like.

Subsequently, as shown in FIG. 12(b), a first metal layer 516X is formed on the underlying layer 513. In general, the thickness of this first metal layer 516X is approximately 100 to 500 nm. As the first metal layer 516X, a Ta metal or one of various Ta alloys such as a Ta-W alloy may be used (as a metal added to Ta, in addition to tungsten, an element in Groups XI to XIII in the periodic table, such as chromium, molybdenum, rhenium, yttrium, lanthanum, or dysprosium, may be mentioned). This first metal layer 516X can be formed by a sputtering method, an electron beam deposition method, or the like.

Next, as shown in FIG. 12(c), the first metal layer 516X is patterned by a photolithographic method and an etching method, so that a planar pattern shown in FIG. 12(e) having the wire portion 516A and the elemental portion 516B branched off from this wire portion 516A is formed. Subsequently, a voltage is applied between a chemical solution, such as an aqueous solution containing citric acid, and the wire portion 516A and the elemental portion 516B thus patterned, whereby, as shown in FIG. 12(d), an insulating thin-film 516a having a small thickness (for example, a thickness of approximately 10 to 35 mm) is formed on the surfaces of the wire portion 516A and the elemental portion 516B.

Next, a root portion of the elemental portion 516B branched off from the wire portion 516A is removed by etching or the like, whereby, as shown in FIG. 12(f), the wire portion 516A and the elemental portion 516B are separated from each other.

Next, as shown in FIG. 13(a), a reflective metal composed of Al, an Al alloy, Cr, a Cr alloy, Ag, an Ag alloy, or the like is deposited by a deposition method or a sputtering method, whereby a second metal layer 517X is formed. Subsequently, the second metal layer 517X is patterned by a photolithographic method and an etching method, whereby the connecting portion 517 and the reflective layer 514 are formed as shown in FIGS. 13(b) and (c). In this step, the opening portions 514a are simultaneously formed in the reflective layer 514.

Next, as shown in FIG. 14(a), a transparent conductive material such as ITO is deposited by a sputtering method, so that a transparent conductive layer 515X is formed. This transparent conductive layer 515X is patterned by a photolithographic method and an etching method, whereby, as shown in FIGS. 14(b) and (c), the transparent electrode 515 is formed so as to cover the entire reflective layer 514 and is also formed so as to cover the wire portion 516A and the connecting portion 517.

The liquid crystal device, the color filter substrate, and the manufacturing methods therefor according to the present invention are not limited to the examples shown in the figures, and it is to be understood that changes and variations may be made without departing from the sprit or the scope of the present invention.

For example, as a liquid crystal device, the liquid crystal devices in the embodiments described above may be changed to a transmissive, a reflective, or a transflective type, and in addition, various known techniques relating to a type of liquid crystal, a driving method, aligned pixel structure may be used.

Advantages

As has thus been described, according to the present invention described above, since both $Ta_2O_5$ and $ZrO_2$ have corrosion resistance against an alkaline solution, film separation is unlikely to occur when the conductive film is patterned by using an alkaline solution. In addition, since $Ta_2O_5$, $ZrO_2$, and $TiO_2$ each has a refractive index higher than that of $SiO_2$, the difference in refractive index between the insulating film and the conductive film can be decreased, and hence, the optical loss at the laminated portion formed of the insulating film and the conductive film can be decreased.

What is claimed is:

1. A liquid crystal device comprising:
   a first substrate;
   a second substrate disposed so as to oppose the first substrate;
   a color layer provided on the first substrate;
   an insulating film provided on the color layer and comprising at least one of $Ta_2O_5$, $ZrO_2$, and $TiO_2$ as a primary component; and
   a conductive film having a property of transmitting light provided on the insulating film;
   wherein the insulating film is a vapor phase deposited insulating film with a thickness of 10 to 100 nm, is alkaline resistant, and has a refractive index in a visible wavelength region in the range of 1.6–2.0; and
   when an optional wavelength in a visible wavelength region is represented by $\lambda$, a sum of an optical thickness of the insulating film and an optical thickness of the conductive film is substantially equal to a product of $\lambda/2$ and a natural number.

2. A liquid crystal device according to claim 1, wherein $\lambda$ is 550 nm.

3. A liquid crystal device according to claim 1, further comprising a transparent resin film between the color layer and the insulating film.

4. A liquid crystal device according to claim 1, further comprising a reflective film between the color layer and the first substrate.

5. A liquid crystal device according to claim 4, wherein the reflective layer has an opening portion therein.

6. A liquid crystal device according to claim 1, further comprising an underlying layer provided on the second substrate and composed of a material substantially identical to that for the insulating film, and an active element provided on the underlying layer.

7. A liquid crystal device according to claim 6, wherein the active element is a TFD.

8. A liquid crystal device according to claim 1 wherein:
   the conductive film has a property of transmitting light, a refractive index of 1.8 to 1.9 in the visible wavelength region, and a thickness of 100 nm to 300 nm.

9. A liquid crystal device according to claim 8, wherein, when an optional wavelength in the visible wavelength region is represented by $\lambda$, a sum of an optical thickness of the insulating film and an optical thickness of the conductive film is substantially equal to a product of $\lambda/2$ and a natural number.

10. A liquid crystal device comprising:
    a first substrate;
    a second substrate disposed so as to oppose the first substrate;
    a color layer provided on the first substrate;
    an insulating film provided on the color layer and comprising $Ta_2O_5$ as a primary component; and
    a conductive film having a property of transmitting light provided on the insulating film;
    wherein the insulating film is a vapor phase deposited insulating film with a thickness of 10 to 100 nm, is alkaline resistant, and has a refractive index approximately equal to a refractive index of the conductive film; and
    when an optional wavelength in a visible wavelength region is represented by $\lambda$, a sum of an optical thickness of the insulating film and an optical thickness of the conductive film is substantially equal to a product of $\lambda/2$ and a natural number.

11. A liquid crystal device according to claim 10, wherein the insulating film further comprises at least one of $ZrO_2$, $TiO_2$, and $SiO_2$ as a component.

12. A liquid crystal device according to claim 10, wherein $\lambda$ is 550 nm.

13. A liquid crystal device according to claim 10, further comprising a transparent resin film provided between the color layer and the insulating film.

14. A liquid crystal device according to claim 10, further comprising a reflective film provided between the color layer and the first substrate.

15. A liquid crystal device according to claim 14, wherein the reflective layer has an opening portion therein.

16. A liquid crystal device according to claim 10, further comprising an underlying layer provided on the second substrate and composed of a material substantially identical to that for the insulating film, and an active element provided on the underlying layer.

17. A liquid crystal device according to claim 16, wherein the active element is a TFD.

18. A liquid crystal device comprising:
    an insulating film comprising at least one of $Ta_2O_5$, $ZrO_2$, and $TiO_2$ as a primary component; and
    a conductive film having a property of transmitting light provided on the insulating film;
    wherein the insulating film is a vapor phase deposited insulating film with a thickness of 10 to 100 nm, is alkaline resistant, and has a refractive index in a visible wavelength region in the range of 1.6–2.0; and
    when an optional wavelength in a visible wavelength region is represented by $\lambda$, a sum of an optical thickness of the insulating film and an optical thickness of the conductive film is substantially equal to a product of $\lambda/2$ and a natural number.

19. A liquid crystal device according to claim 18, wherein $\lambda$ is 550 nm.

20. A liquid crystal device comprising:

a first substrate;

a second substrate disposed so as to oppose the first substrate;

a color layer provided on the first substrate;

an insulating film provided on the color layer, having a property of transmitting light, a refractive index of 1.6 to 2.0 in a visible wavelength region, and a thickness of 10 nm to 100 nm; and a conductive film provided on the insulating film, having the property of transmitting light, a refractive index of 1.8 to 1.9 in the visible wavelength region, and a thickness of 100 nm to 300 nm;

wherein the insulating film is a vapor phase deposited insulating film and is alkaline resistant; and when an optional wavelength in the visible wavelength region is represented by $\lambda$, a sum of an optical thickness of the insulating film and an optical thickness of the conductive film is substantially equal to a product of $\lambda/2$ and a natural number.

* * * * *

UNITED STATES PATENT AND TRADEMARK OFFICE
CERTIFICATE OF CORRECTION

| | |
|---|---|
| PATENT NO. | : 6,825,904 B2 |
| APPLICATION NO. | : 09/904579 |
| DATED | : November 30, 2004 |
| INVENTOR(S) | : Koich Kamijyo |

Page 1 of 1

It is certified that error appears in the above-identified patent and that said Letters Patent is hereby corrected as shown below:

On the title page: item [54] and column 1, line 3 insert

-- LIQUID CRYSTAL DEVICE, COLOR FILTER SUBSTRATE, METHOD FOR MANUFACTURING LIQUID CRYSTAL DEVICE, AND METHOD FOR MANUFACTURING COLOR FILTER SUBSTRATE --.

Signed and Sealed this

Twelfth Day of February, 2008

JON W. DUDAS
*Director of the United States Patent and Trademark Office*